United States Patent
Horne et al.

(10) Patent No.: US 9,965,714 B1
(45) Date of Patent: *May 8, 2018

(54) RFID DISRUPTION DEVICE AND RELATED METHODS

(71) Applicant: CURIO LTD., Fort Worth, TX (US)

(72) Inventors: Gregory L. Horne, Argyle, TX (US); James C. Adams, Burleson, TX (US)

(73) Assignee: CURIO LTD., Fort Worth, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/834,322

(22) Filed: Dec. 7, 2017

Related U.S. Application Data

(63) Continuation of application No. 15/348,791, filed on Nov. 10, 2016, now Pat. No. 9,870,527, which is a
(Continued)

(51) Int. Cl.
*H04W 64/00* (2009.01)
*G06K 19/073* (2006.01)
(Continued)

(52) U.S. Cl.
CPC ... *G06K 19/07336* (2013.01); *G06K 7/10267* (2013.01); *G06Q 20/409* (2013.01); *H04K 3/86* (2013.01)

(58) Field of Classification Search
CPC ......... G06K 19/0723; G06K 19/07749; G06K 7/10366; G06K 2017/0045; G06K 19/073; G06K 7/10297; G06K 7/10316
(Continued)

(56) References Cited

U.S. PATENT DOCUMENTS

| 4,631,708 A | 12/1986 | Wood et al. |
| 4,931,788 A | 6/1990 | Creswick |

(Continued)

FOREIGN PATENT DOCUMENTS

WO 2010108022 9/2010

OTHER PUBLICATIONS

International Search Report issued in corresponding International Application No. PCT/US2013/040636 dated Aug. 26, 2013.
(Continued)

*Primary Examiner* — Keith Ferguson
(74) *Attorney, Agent, or Firm* — Hogan Lovells US LLP

(57) ABSTRACT

Devices and methods of disrupting data transfer between an RFID interrogation device (50, 50') and an RFID data storage device (30, 30') to be protected, are provided. An example of an embodiment of an RFID signal disruptor device includes a container (41, 141) and an RFID signal disruptor circuit (151, 161, 161', 171, 171', 271, 271') configured to substantially disrupt the signal provided by the RFID interrogation device (50, 50') when the RFID signal disruptor device is positioned to protect the RFID data storage device (30, 30'). The RFID signal disruptor device can also include an interrogation indicator (63, 296) configured to indicate to a user of the RFID data storage device (30, 30') that an unauthorized RFID interrogation device (50, 50') is attempting to interrogate the RFID data storage device (30, 30') when the RFID signal disruptor device is positioned in close proximity to the RFID data storage device (30, 30') to provide protection thereto and when the RFID interrogation device (50, 50') is producing the interrogation signal.

13 Claims, 24 Drawing Sheets

Related U.S. Application Data continuation of application No. 14/785,583, filed as application No. PCT/US2013/040636 on May 10, 2013, now Pat. No. 9,525,510.

(60) Provisional application No. 61/817,686, filed on Apr. 30, 2013, provisional application No. 61/814,124, filed on Apr. 19, 2013.

(51) Int. Cl.
*G06Q 20/40* (2012.01)
*G06K 7/10* (2006.01)
*H04K 3/00* (2006.01)

(58) Field of Classification Search
USPC .... 455/1, 41.1, 41.2, 41.3, 39, 121, 289, 38, 455/410, 411, 422.1, 403, 500, 517, 455/426.1, 426.2, 73, 575.1, 575.8, 550.1; 340/10.1, 572.1, 572.7, 568.1, 505, 539.1, 340/12.51
See application file for complete search history.

(56) References Cited

U.S. PATENT DOCUMENTS

| | | | |
|---|---|---|---|
| 5,083,111 A | 1/1992 | Drucker et al. |
| 5,847,662 A | 12/1998 | Yokota et al. |
| 6,121,544 A | 9/2000 | Petsinger |
| 6,195,529 B1 | 2/2001 | Linz et al. |
| 6,473,031 B1 | 10/2002 | Harris |
| 6,580,432 B1 | 6/2003 | Leung et al. |
| 6,687,506 B1 | 2/2004 | Girod |
| 6,892,052 B2 | 5/2005 | Kotola et al. |
| 6,925,287 B2 | 8/2005 | Davie et al. |
| 6,970,070 B2 | 11/2005 | Juels et al. |
| 6,978,146 B1 | 12/2005 | Yardman |
| 7,050,755 B2 | 5/2006 | Kline |
| 7,075,437 B2 | 7/2006 | Bridgelall et al. |
| 7,083,083 B2 | 8/2006 | Droz |
| 7,088,248 B2 | 8/2006 | Forster |
| 7,103,310 B2 | 9/2006 | Lucidarme et al. |
| 7,289,761 B2 | 10/2007 | Mazar |
| 7,298,243 B2 | 11/2007 | Juels et al. |
| 7,336,186 B2 | 2/2008 | Noguchi |
| 7,522,905 B2 | 4/2009 | Hammad et al. |
| 7,532,104 B2 | 5/2009 | Juels |
| 7,671,741 B2 | 3/2010 | Lax et al. |
| 7,711,332 B2 | 5/2010 | Murdoch |
| 7,889,056 B2 | 2/2011 | Gregory Horne |
| 8,237,549 B2 | 8/2012 | Horne |
| 8,305,193 B2 | 11/2012 | Horne et al. |
| 8,505,826 B2 | 8/2013 | Hachey |
| 8,604,995 B2 | 12/2013 | Hammad |
| 9,525,510 B2 | 12/2016 | Horne et al. |
| 2002/0180588 A1 | 12/2002 | Erickson et al. |
| 2004/0100359 A1 | 5/2004 | Reade et al. |
| 2007/0289775 A1 | 12/2007 | Potts et al. |
| 2009/0021343 A1 | 1/2009 | Sinha |
| 2014/0118116 A1 | 5/2014 | Lavedas |

OTHER PUBLICATIONS

International Search Report and Written Opinion issued in International Application No. PCT/US2010/027845 dated May 27, 2010.
Maury Wright, "Contactless Travelling" EDN: Voice of the Electronics Engineer Article Print, pp. 1-4, dated Jul. 7, 2005, found at http://www.edn.com/index.asp?layout=articlePrint&articleID=CA621643.
Kim Zetter, "Jamming Tags Block RFID Scanners", Wired News, pp. 1-4, dated Mar. 1, 2004, found at: http://www.wired.com/news/business/0,1367,62468,00.html.
International Preliminary Examination Report issued in co-pending International Application No. PCT/US2010/027845 dated Aug. 17, 2011.
International Preliminary Report on Patentability issued in co-pending International Application No. PCT/US2010/027845 dated Sep. 29, 2011.
International Preliminary Report on Patentability issued in co-pending International Application No. PCT/US2013/040636 dated Oct. 20, 2015.
Notice of Allowance issued in co-pending Application No. 14/785,583 dated Nov. 7, 2016.

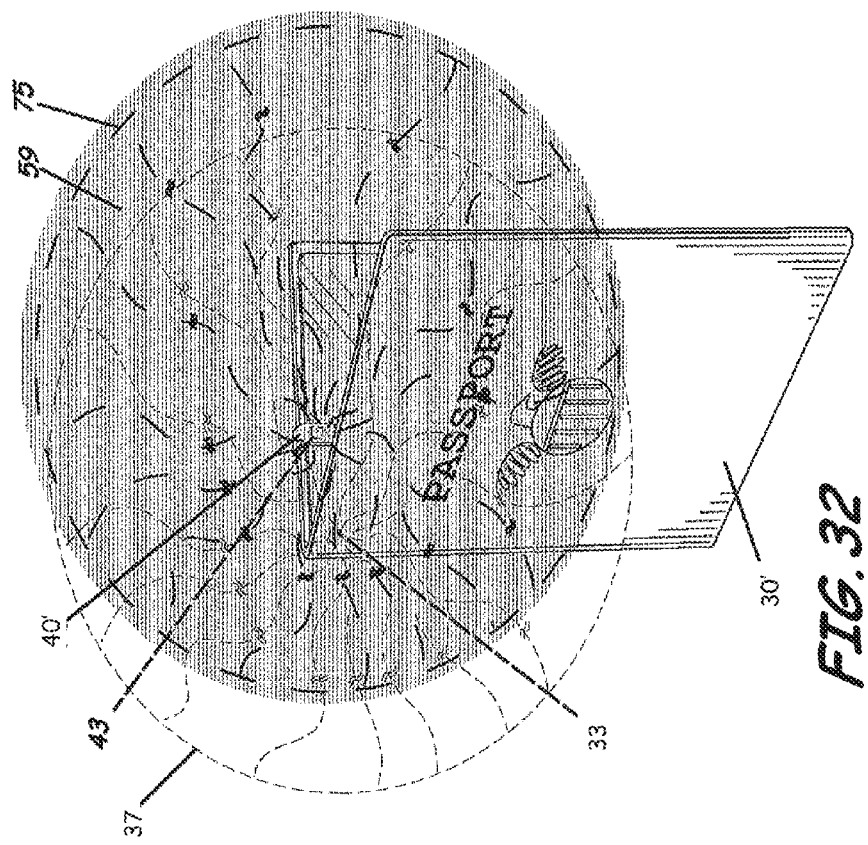
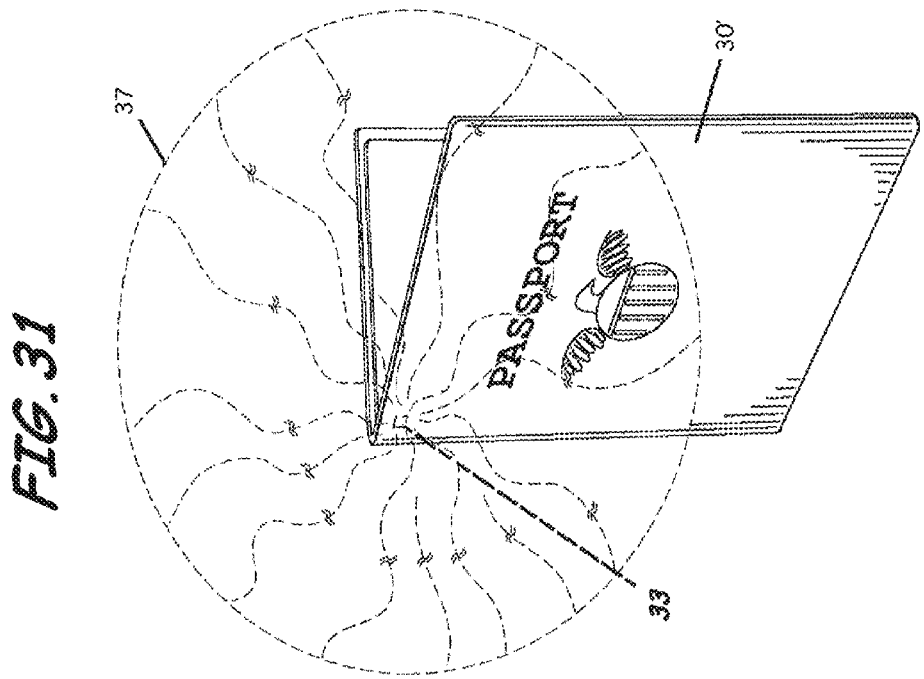

RFID DISRUPTION DEVICE AND RELATED METHODS

CROSS REFERENCE TO RELATED APPLICATIONS

This application is a continuation of U.S. application Ser. No. 15/348,791, titled "RFID DISRUPTION DEVICE AND RELATED METHODS," filed Nov. 10, 2016, which is a continuation of U.S. application Ser. No. 14/785,583, titled "RFID DISRUPTION DEVICE AND RELATED METHODS," filed Oct. 19, 2015, now U.S. Pat. No. 9,525,510, issued Dec. 20, 2016, which is a 35 U.S.C. 371 National Stage of International Application No. PCT/US2013/040636, titled "RFID DISRUPTION DEVICE AND RELATED METHODS," filed May 10, 2013, which claims priority to U.S. Provisional Application No. 61/817,686, titled "RFID DISRUPTION DEVICE AND RELATED METHODS," filed Apr. 30, 2013, and U.S. Provisional Application No. 61/814,124, titled "RFID DISRUPTION DEVICE AND RELATED METHODS," filed Apr. 19, 2013, all of which are incorporated by reference herein in their entirety.

BACKGROUND OF THE INVENTION

1. Field of the Invention

The present invention relates to the field of contactless circuitry and, more particularly, to Radio Frequency Identification ("RFID") devices and methods related to prevent the unauthorized interrogation and tracking thereof.

2. Description of Related Art

Theft of credit or debit card information and identification has become rampant worldwide. Governments, companies, and consumers spend millions of dollars each year to prevent and pursue such thefts.

Over the years, various types of identification technology have been used for credit or debit cards and for identification. These, for example, have included pin numbers, bar codes, and magnetic strips. More recently, however, steps have been taken to use RFID or other contactless chip technology in association with credit or debit cards, passports, documents, and other areas where identification, including portable and remote, are desired. An example of such applications of RFID can be seen in a recent news article titled "Contactless Traveling" by Wright (Electronic Design News (EDN) Jul. 7, 2005) for passport applications. Other types of uses of RFID have emerged, not necessarily coinciding with the desires of the owner of the RFID device. For example, some retailers have instituted what can only be considered inappropriate tracking of the RFID device users in order to analyze their buying habits. Such tracking ability may provide government agencies an ability to continually track an individual's movements. Although appearing somewhat futuristic, it would appear that various governments are currently spending billions of dollars for data mining operation centers to collect data on various commercial transactions. Eventually they may embed RFID tags into all required government documents. Various government agencies would know this and could use the various tracking techniques to track of any individual's movements by pinging the individual's RFID device at opportune locations with RFID interrogation devices or other forms of RFID readers.

The recent developments in technology do not fully address potential security breaches of the RFID such as when an unauthorized RFID interrogation or reading device attempts to extract the RFID information or track the RFID device, especially when a user or possessor of an RFID device is unsuspecting or not cognizant that the RFID device is being interrogated.

Others have attempted solutions at creating blocking RFID devices to enhance privacy. Examples can be seen in U.S. Patent Application Publication No. 2004/0222878 A1 by Juels titled "Low-Complexity Cryptographic Techniques For Use With Radio Frequency Identification Devices," U.S. Pat. No. 6,970,070, by Juels, et al. titled "Method and Apparatus For Selective Blocking of Radio Frequency Identification Devices," and U.S. Pat. No. 7,298,243 by Juels, et al. titled "Radio Frequency Identification System With Privacy Policy Implementation Based on Device Classification." Such attempted solutions, however, do not provide a protection capability that can be applied independent of the information contained in the RFID device to be protected, or the location of the device with respect to the external environment. That is, such devices generally either require a classification engine, require positioning in a designated privacy zone, require application of a specified privacy policy, require knowledge of the identifier of the device to be protected, or require some form of information encryption.

Accordingly, there still exists a need for a simple, flexible, and practical security and privacy protection solution for RFID and other contactless circuitry or chip devices, which can prevent a transmission from an RFID reader or scanner from activating an RFID device, which can prevent the reader from receiving readable data if activated, and which can indicate to the user when an RFID reader or scanner is attempting to interrogate the user's RFID device. There also exists a need for a simple, flexible, and practical security and privacy protection solution which can be restricted to functioning only when in close proximity to the device to be protected, regardless of the location of the device with respect to the external environment, and that will not interfere with the operation of an RFID device reader or scanner when not positioned in close proximity to the device to be protected.

Factors such as expense, size, practical and flexible use requirements for RFID and other contactless chip technology create problems and barriers for widespread use in many applications. Accordingly, there further exists a need for a solution that provides users of RFID devices increased flexibility with little or no increase in expense or size, and yet effectively block or otherwise prevent unauthorized access to RFID information associated with the RFID device to be protected.

SUMMARY OF THE INVENTION

In view of the foregoing, various embodiments of the present invention advantageously provide combinations, devices, and methods of enhanced RFID protection against unauthorized reading or interrogation of an RFID device, which can prevent a transmission from a reader or scanner from activating an RFID device, which can prevent the reader from receiving readable data if activated, and which can indicate to the user when an RFID reader or scanner is attempting to interrogate the user's RFID device. Various embodiment of the present invention also advantageously include combinations, devices, and methods that can advantageously provide users of RFID devices increased flexibility with little or no increase in expense or size and yet effectively block unauthorized access to RFID information associated with a device. Various embodiments of the present invention also advantageously provide personal privacy countermeasures, not just in the form of data protection, but protection of financial or other personal information and/or a unique indicator (e.g., credit/debit card account number, account ID, PIN, license number, Social Security number, employee identification number, etc.) from being logged without the individual's knowledge. Various embodiments of the present invention can perform such objectives by making the RFID device functionally invisible to the RFID reader when the RFID device is being protected.

An example of an embodiment of the present invention provides an RFID signal disruptor device to prevent data transfer between a nearby RFID interrogation device such as an RFID reader, and one or more RFID data storage devices when the RFID signal disruptor device is adjacent the one or more RFID data storage devices interrogated therewith. The RFID signal disruptor device includes an RFID signal disruptor circuit positioned or positionable in a container and configured to disrupt an attempted read of a separate RFID device by an RFID interrogation device when the separate RFID device is positioned adjacent the signal disruptor circuit to allow mutual inductive coupling therebetween. The RFID signal disruptor device is configured to operatively receive power needed to operate the RFID signal disruptor circuit from an interrogation signal emanating from the RFID interrogation device during the attempted read of the separate RFID device when mutually inductively coupled with the separate RFID device.

The signal disruptor circuit, for example, can include a transducer positioned to receive portions of the RFID interrogation signal and to emanate a disruptive signal generated in response to the received portions of the RFID interrogation signal, and a high-speed switch operably coupled to the transducer to provide for approximate signal synchronization with the RFID interrogation signal to thereby generate the disruptive signal having an insubstantial propagation delay. The signal descriptor circuit also can include a signal ringer including a current regulator coupled to the high-speed switch to extend a duration of the disruptive signal being generated, a voltage regulator operably coupled to the high-speed switch and the current regulator to stabilize a base voltage of the high-speed switch, and/or a tunable frequency regulator operably coupled to the high-speed switch to control frequency characteristics of the disruptive signal.

The signal disruptor circuit can also or alternatively include a voltage rectifier operably coupled to the high-speed switch and the transducer to maintain a DC current flowing within the RFID signal disruptor circuit. According to an exemplary configuration, the voltage rectifier is a diode having an anode connected to a second end of the transducer (e.g., RFID antenna) and a cathode connected to a base or gate of the high-speed switch (e.g., single transistor/single stage transistor circuit). The signal disruptor circuit can also or alternatively include a visual operation indicator coupled to the high-speed switch to provide a visual indication that the RFID interrogation device is attempting to interrogate the separate RFID data storage device when the RFID signal disruptor circuit is positioned in close proximity to the separate RFID data storage device, sufficient to allow mutual inductive coupling therebetween, when the RFID interrogation device is producing an interrogation signal within activation range of the separate RFID data storage device. According to an exemplary configuration, the voltage rectifier and the visual indication indicator part provided in a single component such as, for example, a light emitting diode or other similar component/component circuit.

According to an exemplary configuration, the transducer includes an RFID antenna, the high-speed switch includes a transistor and/or single stage transistor circuit arrangement, and the signal ringer includes, for example, one or more wound inductors positioned to cause a signal oscillation, thereby causing additional current to flow within the RFID signal disruptor circuit to extend the duration of the disruptive signal. According to the exemplary configuration, the voltage regulator includes one or more resistors positioned to stabilize base voltage of the transistor to thereby provide for substantially consistent operation of the transistor over a range of voltages associated with the received RFID interrogation signal, and the tunable frequency regulator includes one or more varactor diodes positioned to provide for tuning the resonant frequency of the signal ringer and to provide harmonic multiplication of the frequency of the interrogation signal.

According to the exemplary configuration, the RFID antenna also or alternatively has a planer-shaped coil, and the RFID signal disruptor circuit can contain only a single transistor or single stage transistor circuit arrangement to provide significantly less propagation delay than that resulting from multistage circuit configurations. According to the exemplary configuration or an alternative configuration, the inductor is connected between the emitter of the transistor and a first end of the resistor, a second end of the resistor is connected to the base of the transistor, and the RFID antenna is connected between the collector of the transistor and the second end of the resistor. According to the exemplary configuration or an alternative configuration variation having an alternating current (AC) capacitor, the capacitor can be connected between the first and the second ends of the resistor. According to the exemplary configuration or an alternative configuration, the varactor diode is connected between the base and the emitter of the transistor.

Advantageously, according to an exemplary configuration or an alternative configuration, the RFID signal disruptor device is devoid of any permanent power storage device (e.g., battery), and instead relies solely on energy from the RFID interrogation signal to power the RFID signal disruptor circuit. This advantageously reduces the size, profile, and weight of the device thereby allowing ready application to a planer shaped container, for example.

Another example of an embodiment of the RFID signal disruptor circuit includes an antenna positioned to receive portions of the RFID interrogation signal and to emanate a disruptive signal, and a transistor defining a high-speed switch operably coupled to the antenna to provide for approximate signal synchronization with the RFID interrogation signal to thereby generate the disruptive signal having an insubstantial propagation delay therebetween. According to an embodiment, the antenna can be in the form of a planer-shaped coil is understood by one of ordinary skill in the art. According to an embodiment, in order to reduce propagation delay, power consumption, and weight of the device, the transistor can be a single transistor or first stage transistor circuit.

The circuit can also include a wound inductor (not a coiled antenna) coupled to the transistor and positioned in the RFID signal disruptor circuit to cause a signal oscillation such as, for example, ringing, thereby causing additional current to flow within the RFID signal disruptor circuit to thereby extend a duration of the disruptive signal being generated. The circuit can further include a resistor positioned within the RFID signal disruptor circuit to stabilize a base voltage of the transistor to thereby provide for substantially consistent operation of the transistor over a range of voltages associated with the received RFID interrogation signal.

According to an embodiment, the wound inductor can be connected between the emitter of the transistor and a first end of the resistor, a second end of the resistor is connected to the base of the transistor, and the antenna is connected between the collector of the transistor and the second end of the resistor, and then AC capacitor is connected between the first and second ends of the resistor.

According to an embodiment, the circuit can also include a varactor diode operably coupled to the transistor to provide for tuning the resonant frequency of a signal ringer portion of the circuit and to provide harmonic multiplication of the frequency of the interrogation signal. The varactor diode can be connected between the base and the emitter of the transistor. The varactor diode can also be tunable.

According to an embodiment, the above described RFID signal disruptor circuit is a first RFID signal disruptor circuit positioned within a container such as, for example, a plastic card or passport book or card to form the RFID signal disruptor. According to another embodiment, the RFID signal disruptor can include a second RFID signal disruptor circuit positioned within the same container. In this embodiment, the polarity of the transistor in the first circuit can be the opposite of that of the second circuit. For example, the first transistor is a bipolar junction PNP transistor and the second transistor is a bipolar junction NPN transistor. Note, other forms of transistors including field effect transistors can be utilized as substitutes.

Another example of an embodiment of the RFID signal disruptor circuit includes a first antenna configured to receive portions of the RFID interrogation signal, a second antenna configured to transmit a disruptive signal, a first transistor having a collector connected to a first end of the second antenna, and a second transistor having a collector connected to a second end of the second antenna and an emitter connected to an emitter of the first transistor. The circuit can also include a frequency modulator including a capacitor in parallel with a diode to provide a low-frequency ringing. According to an exemplary configuration, the first end of the capacitor and the first end of the diode are operably coupled to a medial portion of the second antenna, and the second end of the capacitor and the second end of the diode is operably coupled to the emitter of the first transistor and the emitter of the second transistor.

Another example of an embodiment of the present invention provides a combination of a separate RFID device and a separate RFID signal capture device each configured to be positioned separately into a container. More specifically, the combination includes a separate RFID device carrying and RFID transponder (tag) configured to be positioned in the container and a separate RFID signal capture device configured to be positioned adjacent the separate RFID device and in the container so that when an unauthorized RFID interrogation device attempts to interrogate the separate RFID device from within the container, the separate RFID signal capture device positioned adjacent the separate RFID device blocks or otherwise prevents the attempted read, and configured so that when an authorized user desires to use the separate RFID device for an authorized read, the authorized user selectively removes either the separate RFID device or the separate RFID signal capture device from being adjacent each other and presents the separate RFID device for the authorized read.

Another example of an embodiment of a device to prevent unauthorized RFID interrogation when the device is positioned adjacent a separate RFID device, includes an RFID signal capture device including an incoming signal detector configured to detect an incoming signal attempting to interrogate the separate RFID device responsive to the detection of the incoming interrogation signal to respond to the incoming interrogation signal with disruptive read signals.

Another example of an embodiment of a device for preventing unauthorized RFID interrogation when the device is positioned adjacent a separate RFID device, includes an RFID signal capture device including an incoming signal detector to detect incoming RFID interrogation signals responsive thereto, and an RFID interferer to interfere with activation of operation ability of the separate RFID device responsive to the incoming signal detector.

Another example of an embodiment of a device to prevent unauthorized RFID interrogation includes an RFID signal capture device that works with the RF carrier of the tag/transponder circuit of an RFID device to be protected using any standard modulation or data protocol, such as, for example, amplitude shift keying (ASK), frequency shift keying (FSK), or phase shift keying (PSK), among others as understood by those skilled in the art Advantageously, the RFID signal capture device, according to this exemplary embodiment, does not directly emit or radiate signals, but rather, only captures the signal from the tag and disrupts the normal operation of the tag of the RFID device to be protected. The tag of the RFID device can include an LC tuned circuit, for example, set to 13.56 MHz for operations with RFID devices and RFID readers that communicate using this frequency. The RFID signal capture device can inductively couple with the inductor-capacitor (LC) tuned circuit of the tag of the RFID device to disrupt the signal received by the RFID device. Note, because of the coupling of the RFID signal capture device with the RFID tag of the RFID device to be protected, a 6.78 MHz signal at one-half (½) the power, a 26 MHz (second harmonic), or both may be present to further disrupt the normal operation of the tag. This configuration has been found through testing to allow the RFID signal capture device to provide protection to an RFID device at all distances from the RFID reader when placed, for example, within ½-inch (12 mm) or so of the tag of the RFID device.

Further, because the antenna/coil/transceiver portion of the RFID signal capture device is not a tuned circuit, according to this configuration, advantageously, the RFID signal capture device affects only the tag when in close proximity as it must couple with the tuned circuit of the tag to operably function. As such, when not coupled with a tag, the device has substantially no effect on either the RFID device (or devices/tags) to be protected or on the RFID reader. Testing of the RFID signal capture device according to this configuration showed that the RFID reader could still read RFID tags not coupled with the RFID signal capture device even when the device was physically placed on the reader. That is, as noted above, the RFID signal capture device, according to this configuration, is activated by the electrical field that is produced at the RFID tag's coil/antenna, and not merely from the incoming signal from the RFID reader independent of the RFID device to be protected.

The RFID signal capture device can advantageously include an internal phase capture that changes the impedance of the tag's tuned circuit, which causes a phase variance of the 13.56 MHz carrier for the RFID tag when in close proximity, thus, inhibiting the tag of the protected RFID device from responding to the reader. Also advantageously, the RFID signal capture device can be configured to function without a permanent internal power source, thus preventing the RFID signal capture device from radiating a signal without the passive RFID tag or tuned circuit to allow power harvesting, so that the device can only be activated when the electrical field is present in the RFID tag and when the two devices are in close proximity. In other words, the RFID signal capture device ceases to function when the field is removed—i.e., when the RFID signal capture device and the RFID device to be protected are sufficiently physically separated, regardless of the position of the RFID reader.

Advantageously, by providing user separable RFID or other contactless circuitry signal capture devices and RFID or other contactless circuitry devices, various embodiments of combinations, devices and methods of the present invention advantageously provide flexibility, portability, and user controlled protection for a user's RFID or other contactless circuitry device.

Another example of an embodiment of a device to prevent unauthorized RFID interrogation (e.g., an RFID signal capture device), for example, performs such actions by preventing data transfer between a nearby RFID reader including an RFID reader inductor and an RFID tag including an RFID tag inductor/coil ("antenna"), for example, carried by a personal identification or financial transaction medium, which together form an RFID device to be protected. The device can include a container, a signal capture circuit carried by the container, and an interrogation indicator carried by the container.

The container can be, for example, in the form of a plastic card similar to a standard credit/debit card, an ID device or passport, or alternatively in another form such as, for example, a wallet, purse, card carrier, or other medium to carry both the RFID device to be protected and the RFID signal capture device. In the alternative form, a pocket or card holder section in the wallet, purse, etc., can advantageously have the RFID signal capture device embedded therein to protect any RFID devices (credit, debit, phone cards, etc., or ID cards) when stowed away in the respective wallet, purse, etc.

The signal capture circuit of the RFID signal capture device can be configured to mutually inductively couple with the RFID tag when positioned in close proximity thereto and when the RFID reader is producing an interrogation signal to thereby effectively prevent data transfer between the RFID tag and the RFID reader. The signal capture circuit can include a signal capture circuit antenna separate from the antenna of the tag of the RFID device to be protected, but nevertheless positioned to receive an interrogation signal carrying a data signal from the RFID reader directed to the RFID device to be protected, and can include a signal processing portion operably coupled thereto. The signal processing portion can include a timing synchronizer and an amplifier/transistor/amplifier module positioned to return a modified carrier signal responsive to the interrogation signal to thereby effectively prevent the data transfer between the RFID reader and the RFID tag.

The interrogation indicator of the RFID signal capture device can be configured to indicate to a user of the RFID device carrying the RFID tag that the RFID reader is attempting to interrogate the RFID tag when both positioned in close proximity to the RFID tag and when the RFID reader is producing the interrogation signal. The interrogator indicator can include an interrogation indicator antenna positioned to receive an interrogation signal from the RFID reader, a power circuit or module to harvest power and/or extended storage of power, and an indicator circuit module or other form of circuit including an audible indicator and/or a visual indicator, configured to indicate to the user of the RFID tag that the RFID reader is attempting to interrogate the RFID tag when RFID signal capture device is positioned in close proximity to the RFID tag and when the RFID reader is producing the interrogation signal.

Another example of an embodiment of a device to prevent unauthorized RFID interrogation, for example, by preventing data transfer between a nearby RFID reader and an RFID device to be protected provides an RFID signal capture device including a container, a signal capture circuit carried by the container and configured to mutually inductively couple with the RFID tag when positioned in close proximity thereto and when the RFID reader is producing an interrogation signal, and can include an interrogation indicator carried by the container and configured to indicate to a user of the RFID tag when positioned in close proximity thereto and when the RFID reader is producing the interrogation signal that the RFID reader is attempting to interrogate the RFID tag.

The interrogation indicator can include an antenna positioned to receive an interrogation signal from the RFID reader, a voltage rectifier positioned to provide operational interrogator indicator circuit power responsive to the interrogation signal, and an indicator including an audible indicator and/or a visual indicator configured to indicate to the user of the RFID tag that the RFID reader is attempting to interrogate the RFID tag when RFID signal capture device is positioned in close proximity to the RFID tag and when the RFID reader is producing the interrogation signal.

The RFID signal capture device, according to this configuration, can advantageously not only indicate the presence of an interrogation signal, but can also substantially disrupt the signal provided by the RFID reader so that the RFID device to be protected cannot properly identify the timing signal provided by the reader, and even if identified, cannot properly extract the data provided by the RFID reader sufficient to be able to respond to thereby effectively prevent data transfer between the RFID tag and the RFID reader. Further, even if obtaining sufficient data to respond, the RFID signal capture device can advantageously substantially disrupt the signal provided by the RFID device to be protected so that the RFID reader is unable to extract sufficient data provided by the RFID device to be protected to either obtain the protected information or to identify the user in order to track the actions or movement of the user.

Another example of an embodiment of a device to prevent unauthorized RFID interrogation, for example, by preventing data transfer between a nearby RFID reader and an RFID device to be protected, includes a container and a signal capture circuit carried by the container and configured to mutually inductively couple with the RFID transponder when positioned in close proximity thereto and when the RFID reader is producing an interrogation signal of sufficient strength to interrogate the RFID transponder and to prevent data transfer between the RFID transponder and the RFID reader responsive to being positioned in close proximity to the RFID transponder and responsive to the RFID reader producing an interrogation signal of sufficient strength to interrogate the RFID transponder.

Embodiments of methods of enhancing protection against unauthorized interrogation of an RFID or other contactless circuitry device, are also provided. An example of an embodiment of a method can include positioning a separate RFID signal capture device adjacent a separate RFID device to block RFID interrogation and selectively separating the separate RFID device from the separate RFID signal capture device for authorized interrogation of the separate RFID device. Another example of an embodiment of a method of enhanced protection against unauthorized interrogation of a contactless circuiting device includes positioning a separate contactless circuitry signal capture device in association with a container and adjacent a separate contactless circuitry device to thereby block unauthorized interrogation of the separate contactless circuitry device, and selectively separating the separate contactless circuitry device from being adjacent the separate contactless circuitry block device for authorized interrogation of the separate contactless circuitry device.

Another example of an embodiment of a method can include inductively coupling an RFID signal capture device with the RFID tag (or multiple tags) being protected and the RFID reader to thereby effectively prevent data transfer between the RFID tag and the nearby RFID reader when the RFID signal capture device is positioned by a user in close proximity to the RFID tag and when the RFID reader is producing an interrogation signal, and inductively coupling the RFID signal capture device with the RFID tag when positioned in close proximity to the RFID tag and when the RFID tag is producing a reply to an interrogation signal.

The method can also include indicating to the user of the RFID tag that the RFID reader is attempting to interrogate the RFID tag when the RFID reader is producing the interrogation signal and when the RFID signal capture device is in close proximity to the RFID tag, whereby such indication is not provided when the RFID signal capture device is not in close proximity to the RFID reader (i.e., when the indicator circuit is not receiving a sufficient signal strength). The indicating can include illuminating a visual indicator carried by the RFID signal capture device, and/or sounding an audible indicator carried by the RFID signal capture device.

The method can also include the step of allowing data to transfer between the RFID device and an RFID reader by selectively substantially separating the RFID signal capture device from being adjacent the RFID tag to allow authorized interrogation of the RFID tag. Accordingly, the RFID signal capture device can be configured to not interfere with operation of the RFID reader when the RFID signal capture device is not positioned in close proximity to an RFID tag.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 31 is a schematic view of an RFID device positioned in a container;

FIG. 32 is a schematic view of a combination of separate RFID device and a separate RFID signal capture device positioned in the container shown in FIG. 31 according to an embodiment of the present invention;

DETAILED DESCRIPTION

Figure 1:
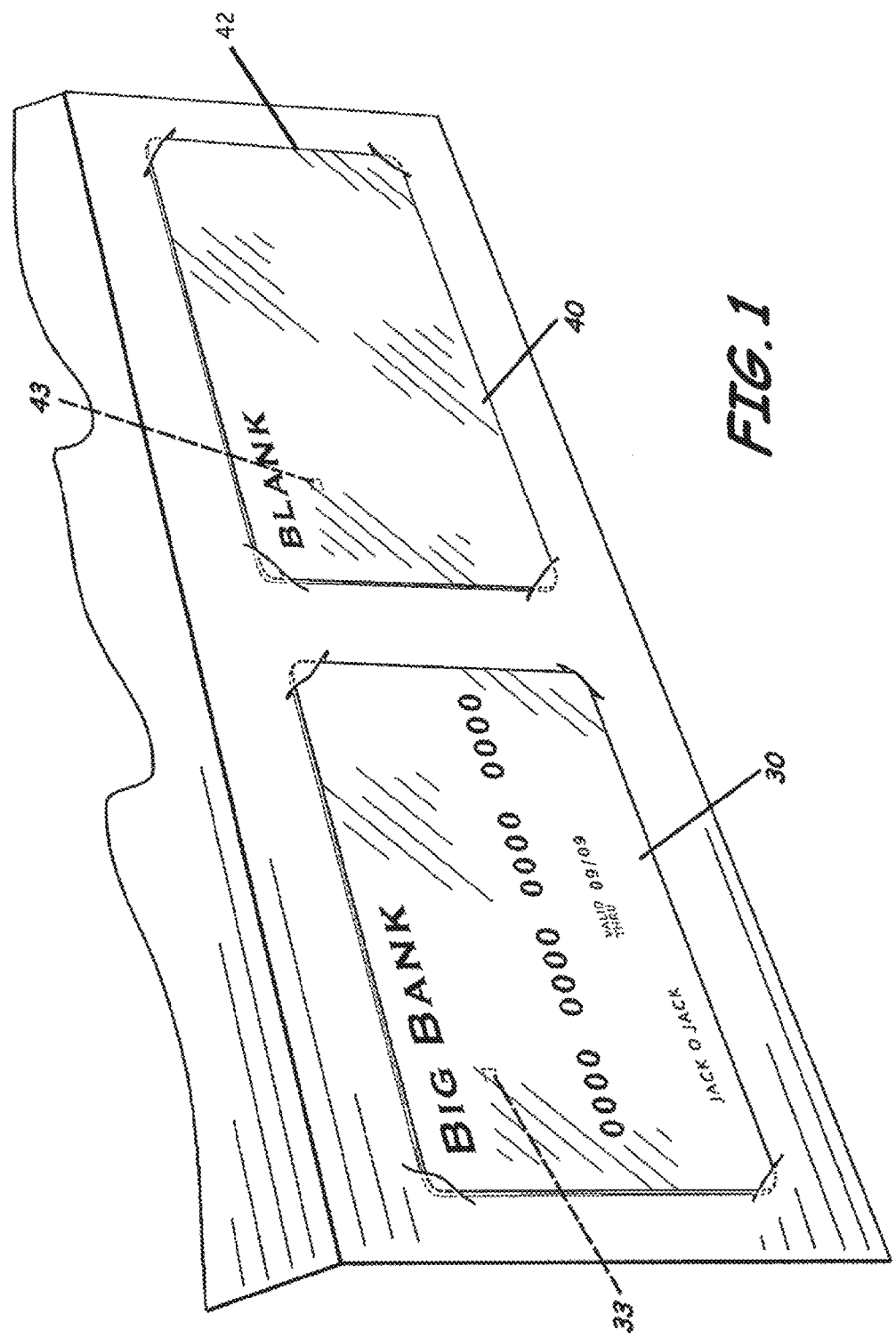
FIG. 1 is a perspective view of a combination of a separate RFID device and a separate RFID signal capture device positioned in a container according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments. Note, as used herein, the terms "nearby" and "in close proximity" generally mean approximately within the interrogation response field of the referred to radiofrequency identification (RFID) device, interrogation response field of the referred to RFID signal capture device, and/or interrogation range of the referred to RFID interrogator or other reader.

As perhaps best shown in FIGS. 1-5, various embodiments of the present invention provide a RFID signal capture device 40 including, for example, a signal capture circuit 43 carried by a container (e.g., plastic card 41) configured to effectively prevent data transfer between a nearby RFID interrogator/scanner or other form of RFID reader 50 (see, e.g., FIG. 26) as known and understood by those skilled in the art, and an RFID device 30 including an RFID transponder or other circuit typically referred to as an RFID tag 33 as known and understood by those skilled in the art, which is configured to inductively couple with an RFID reader circuit 53 of the RFID reader 50. The RFID signal capture device 40, for example, in a preferred configuration, can protect the information contained in the RFID tag 33 carried by various RFID devices 30 including any standard ISO 14443 and ISO 15593 credit or personal ID card, etc., from being read surreptitiously. Beneficially, the preferred configuration of the RFID signal capture device 40 requires that the device 40 be in close proximity to the RFID card(s) or other devices 30 to be protected, as shown, for example, in FIG. 3, in order to perform its protective function. That is, according to the preferred configuration, when the device 40 is not near an RFID card(s)/device(s) 30 to be protected, i.e., not within the interrogation response field or e-field 37 (see, e.g., FIG. 2), it will be powered down and will not interfere with the normal operation of the RFID reader 50.

Figure 5:
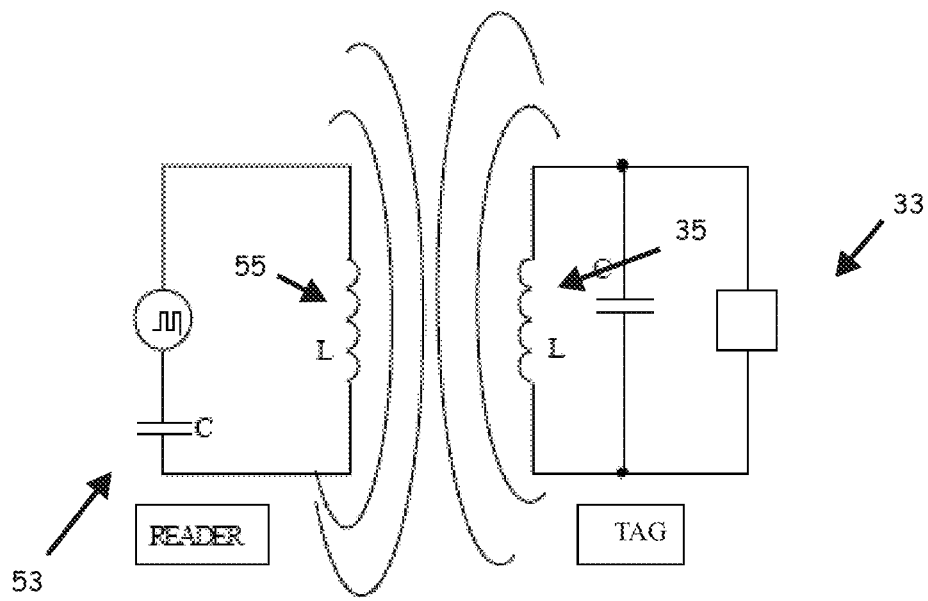
FIG. 5 is a schematic diagram illustrating inductive coupling between an RFID reader and an RFID device.

As perhaps best shown in FIG. 5, in order to function properly, inductively coupled passive RFID systems as known and understood by those skilled in the art, need good coupling and maximum energy transfer from the RFID reader circuit 53 of the RFID reader 50 to RFID tag 33. For this reason, such systems generally use parallel inductor-capacitor ("LC") circuits in the tag antenna 35 and series LC circuits in the reader antenna 55, as understood by those skilled in the art. To generate the maximum power field in the RFID device 30, the RFID reader circuit 53 of the RFID reader 50 is generally designed to achieve maximum coil/antenna current at the resonant frequency. Since current through a coil generates a magnetic field, this field is generally maximized in a series LC circuit, whose impedance approaches zero at resonance. To maximize the voltage gain at resonance in an RFID tag 33, a parallel LC circuit is typically used which provides an impedance that approaches infinity at resonance. In a system designed to read standard ISO 14443 and ISO 15593 cards 30, for example, the power provided by an appropriate RFID reader 50, or more particularly, the RFID reader circuit 53 of the RFID reader 50, generates at least a 3-volt field in the RFID tag 33 when it is placed in proximity Note, hereinafter, the terms RFID reader circuit 53 and RFID reader 50 may be used interchangeably for illustrative purposes.

Figure 6:
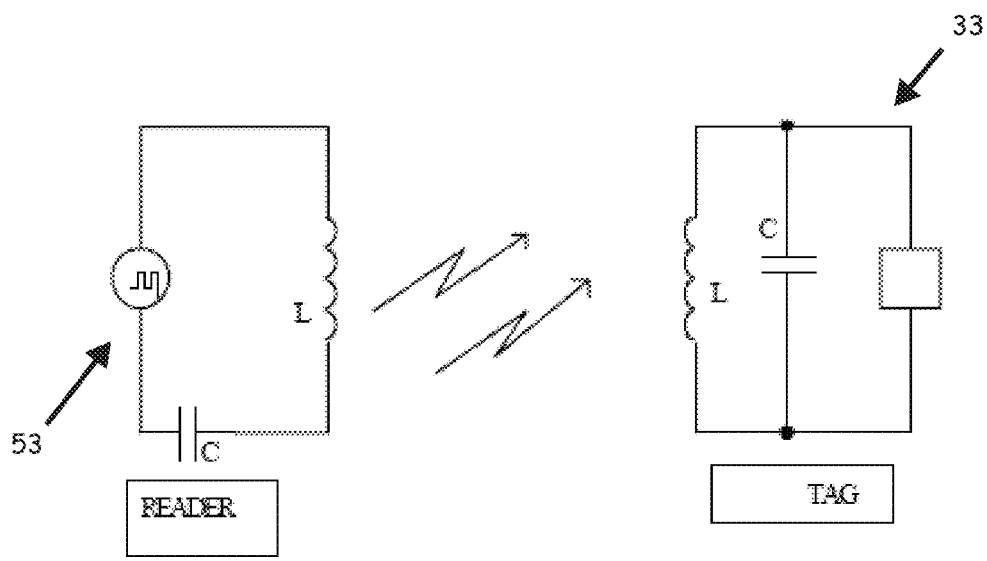
FIG. 6 is a schematic diagram illustrating data transmission between an RFID reader and an RFID device.

As perhaps best shown in FIG. 6, during normal operation of a financial or personal transaction between an RFID reader 50 and an RFID device 30, the RFID reader circuit 53 of the RFID reader 50 provides power, clock, and data for the tag 33 of the RFID device 30. The tag 33 will then "talk" back to the RFID reader 50 with the account number and other information as understood by those skilled in the art. Most credit card transactions are very quick since the data transfer rate is quite high.

As perhaps best shown in FIGS. 7-8 and 12-13, and as will be described in more detail later, the signal capture circuit 43 of the RFID signal capture device 40 according to the illustrated configuration, has no tuned circuit on the antenna, and therefore, must be coupled with the RFID device 30, for example, in order to be active. Once the RFID tag 33 comes into contact with a signal from the RFID reader 50 (i.e., RFID reader circuit 53) having a sufficient signal strength, the signal capture circuit 43 of the RFID signal capture device 40 becomes inductively coupled with the RFID tag 33 of the RFID device 30 in a transformer-type circuit. Once sufficient operating power is achieved, the signal capture circuit 43 begins to disrupt communication between the RFID device 30 and the RFID reader 50. According to the exemplary configuration, this can be accomplished by capturing the e-field 37 of the tag 33 to thereby prevent the tag 33 from "seeing" the RFID reader's data. In this configuration, the signal capture circuit 43 uses energy from the field 37 of the tag 33 of the RFID device 30, and does not emit signals back to the RFID reader 50 when not coupled with the tag 33 of the RFID device 30. Further, in this configuration, when a "nearby" multiple tags 33 and when each tag 33 is receiving a sufficient signal strength from the RFID reader 50, the un-tuned signal capture circuit 43 captures the e-field of at least one tag 33, but more preferably, each of the tags 33, simultaneously, in order to protect all of the tags 33.

Inductively coupled systems, including passive 13.56-MHz RFID systems used by the financial services industry, for example, generally behave like loosely coupled transformers (see, e.g., FIG. 5) as understood by those skilled in the art. The magnetic coupling between the primary winding (e.g., reader antenna coil 55) and secondary winding (tag antenna coil 35) conveys power from RFID reader 50 to the RFID tag 33. Tuned LC circuits are typically used at these frequencies to maximize coupling between the primary and secondary winding. The RFID reader 50 continuously emits RF carrier signals and observes any received RF signals for data.

Under normal unprotected operations, when within range of a passive RFID transponder, such as tag 33, for example, the presence of the tag 33 modulates the RF field generated by the RFID reader circuit 53 of the RFID reader 50. The RFID reader circuit 53 correspondingly detects such modulation. Prior to modulating the RF field, the passively configured tag 33 absorbs a small amount of energy emitted by the RFID reader circuit 53, which is used by the tag 33 to effectively transfer "send" the modulated data once sufficient energy is acquired from the RF field generated by the RFID reader circuit 53. The RFID reader circuit 53 demodulates the signals modulated by the tag 33, and decodes the information for further processing. For RFID devices 30 expecting to be utilized in the presence of other RFID devices 30 and RFID devices 30 carrying multiple RFID tags 33, the tags 33 may be configured with an anti-collision protocol, described later, which in a typical example, can cause each RFID tag 33 to slightly off-tune. Similarly, the RFID reader circuit 53 may be configured with an anti-collision protocol which can cause the RFID reader 50 to slightly off-tune.

Under protected operations, i.e., when the signal capture circuit 43 of the RFID signal capture device 40 is positioned in close proximity to the RFID tag 33, or vice versa, the e-field 37 required by the RFID tag 33 is disrupted. When protecting multiple closely positioned RFID tags 33, simultaneously, the inductive coupling of the RFID signal capture device 40 can be with only one of the RFID tags 33 to sufficiently disrupt or suppress the e-field 37 of each RFID tag 33. Note, any sine wave signal will activate the RFID signal capture device 40 provided the power level is strong enough, and the RFID signal capture device 40 is in close proximity to the RFID tag 33. As such, according to the exemplary configuration, protection can be provided to each of the RFID tags 33, as long as the RFID tags 33 are within the e-field 47 of the signal capture circuit 43 of the RFID signal capture device 40 when being activated.

Figure 12:
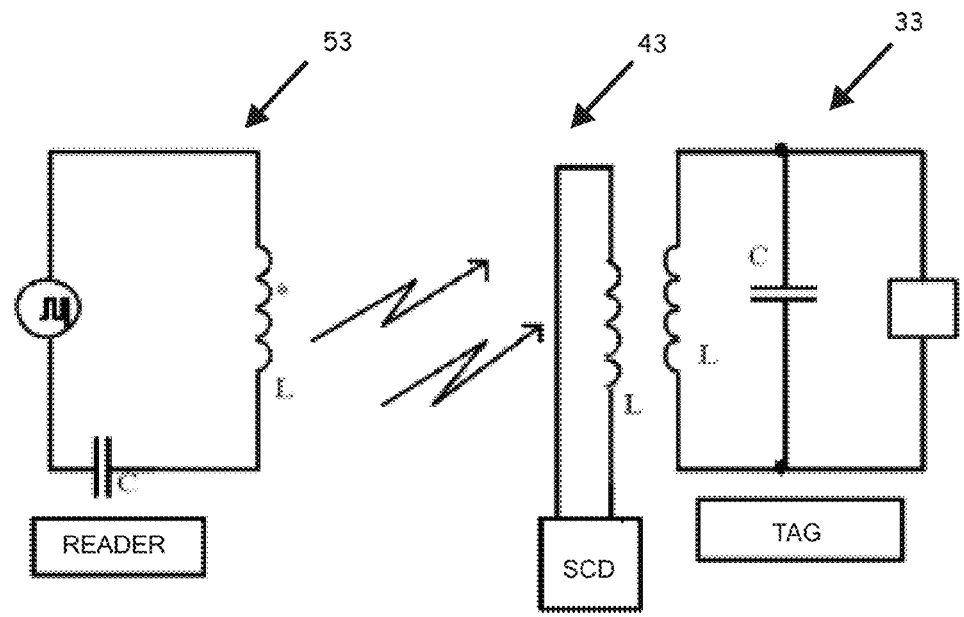
FIG. 12 is a schematic diagram of an RFID signal capture device positioned in close proximity to an RFID device to be protected being interrogated by an RFID reader according to an embodiment of the present invention.
Figure 13:
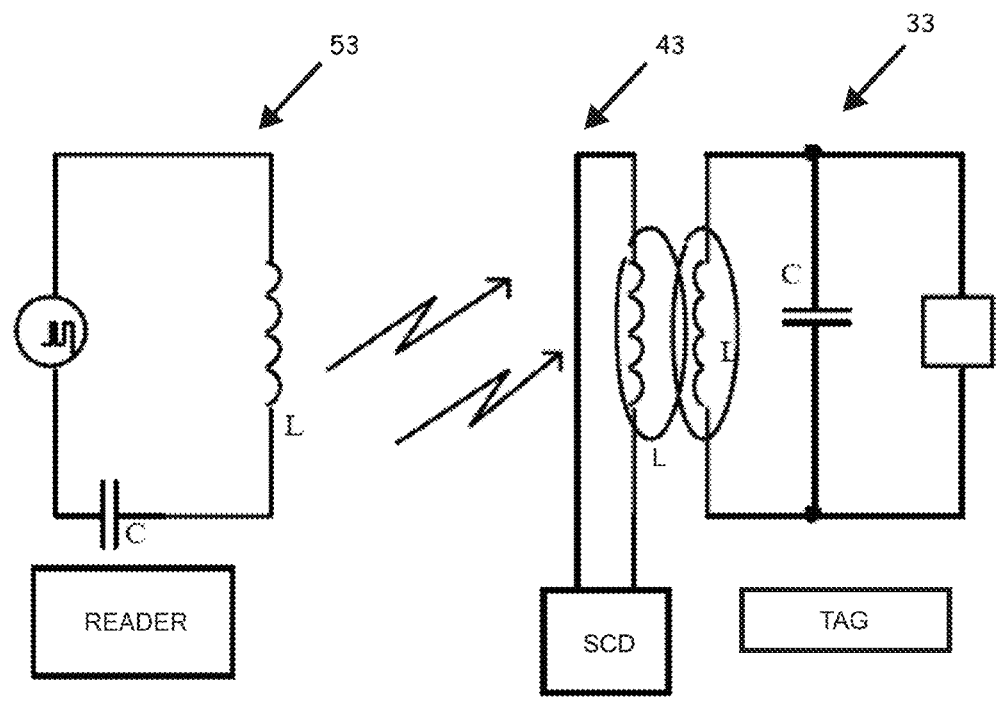
FIG. 13 is a schematic diagram of an RFID signal capture device inductively coupling with an RFID device to be protected in response to an interrogation by an RFID reader according to an embodiment of the present invention.

According to the configuration illustrated in FIGS. 12-13, a time-variant field from the RFID reader circuit 53, which reader coil/antenna 55 generates and the tag coil/antenna 35 receives, induces current and voltage across the tag coil/antenna 35 as understood by those skilled in the art. The signal capture circuit 43 of the RFID signal capture device 40 effectively captures this energy when coupled with an RFID tag 33 and performs one or more disruptive functions which resultingly prevent any useful data exchange. Such disruptive functions can include frequency-based data modulation (e.g., frequency shift keying or analog frequency modulation), phase-based data modulation (e.g., phase shift keying or analog phase modulation), and/or amplitude-based data modulation (e.g., amplitude shift keying/backscatter modulation, on-off shift keying, tuning-detuning, or various forms of digital or analog amplitude modulation) as understood by those skilled in the art.

Figure 15:
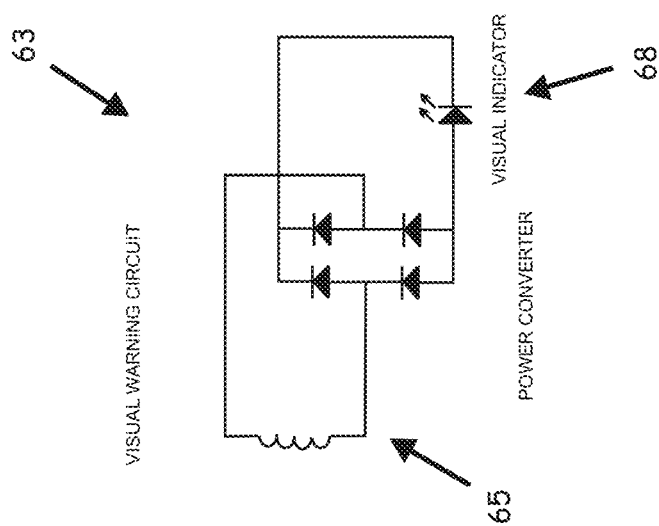
FIG. 15 is a schematic diagram of a visual form of an interrogation indicator circuit of an RFID signal capture device according to an embodiment of the present invention.
Figure 14:
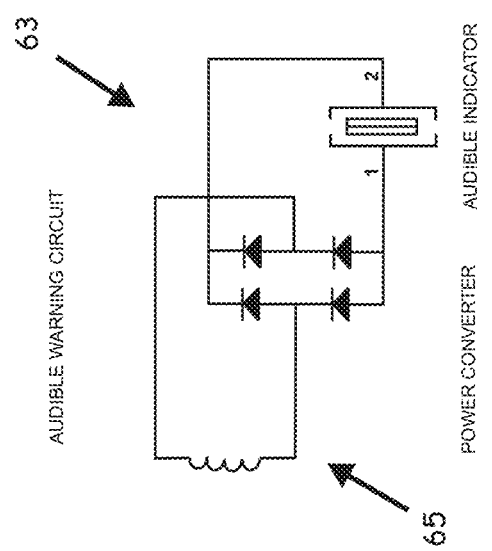
FIG. 14 is a schematic diagram of an audible/vibratory form of an interrogation indicator circuit of an RFID signal capture device according to an embodiment of the present invention.

Further, as perhaps best shown in FIGS. 14 and 15, and as will be described in more detail later, the RFID signal capture device 40, according to the illustrated configuration, can include an interrogation indicator 63 configured to indicate to a user of the RFID device 30 that an RFID interrogator or other reader 50 is attempting to interrogate the RFID tag 33, or more particularly, to indicate when the interrogation indicator 63 of the RFID signal capture device 40 is receiving a signal of sufficient strength to interrogate the RFID tag 33, regardless of position—i.e., when the RFID reader 50 is producing an interrogation/read signal (i.e., power and/or handshake signal) sufficient to read data from the RFID tag 33 of the RFID device 30 (i.e., sufficient when not being protected). This embodiment of the interrogation indicator 63, can beneficially allow the user to sweep an area or location with the RFID signal capture device 40 to determine whether or not an RFID reader 50 signal is being generated, and/or to indicate that an RFID reader 50 is generating an interrogation signal of sufficient strength when the RFID tag 33 is being protected against an unauthorized interrogation/read signal having a substantially sufficient strength to read data from the RFID tag 33. In a first alternate configuration, the interrogation indicator 63 can identify an interrogation signal having a signal strength substantially less than that required to read the protected RFID device 30, but greater than that of background noise. In a second alternate embodiment of the interrogation indicator 63, the interrogation indicator 63 can be configured to indicate that an RFID reader 50 is generating an interrogation signal of sufficient strength to read data from the RFID device 30 only when the RFID tag 33 is positioned in close proximity to the signal capture circuit 43 of the RFID signal capture device 40 and when the RFID reader circuit 53 of the RFID reader 50 is producing an interrogation/read signal sufficient to read data from the RFID device 30.

The interrogation indicator 63 can include an interrogation indicator antenna 65 as understood by those skilled in the art, positioned to receive an interrogation signal from the RFID reader circuit 53 of the RFID reader 50, and an indicator such as, for example, an audible/vibration indicator 67 (e.g., piezoelectric, etc.) and/or a visual indicator 68 (e.g., LED, color sensitive film, etc.) as understood by those skilled in the art, configured to alert the user of the RFID device 30 of the presence of an interrogation signal (i.e., that the RFID reader 50 is attempting to interrogate the RFID tag 33) when RFID signal capture device 40 is positioned in close proximity to the RFID tag 33 and when the RFID reader 50 is producing the interrogation signal. Regardless of the configuration, an indication of attempted or actual data transfer can be provided in the form of a chirping of the audible/vibration indicator 67 or a flicker of the visual indicator 68. Similarly, an indication of an attempted or actual interrogation without data transfer or an interrogation where the data signal riding on the carrier signal is, for example, too high to be visually or audibly distinguished from the carrier signal can be provided, for example, in the form of a relatively constant tone or hum provided by the audible/vibration detector 67 or a relatively steady or continuous illumination of the visual indicator 68. One of ordinary skill in the art should recognize that other audible/vibration and visual indications are within the scope of the present invention.

According to a preferred configuration, the antenna or antennae 65 is independent of the RFID signal capture device antenna (e.g., signal capture circuit antenna/assembly 45), and the RFID device antenna 35. According to embodiments using physical circuit elements (e.g., wire, fiber optics, chemicals, or inks), the indicator 63 can also include a voltage rectifier 69 to increase the power harvesting capability of the indicator 63.

Note, although illustrated in the form of electricity conducting circuits, the interrogation indicator 63 can alternatively take the form of a chemical combination or compound as known to the skilled in the art, positioned on a surface of the RFID signal capture device 40, which will illuminate (e.g., glow) when exposed to the carrier frequency of the RFID reader 50, to indicate the presence of an RFID interrogation signal to the user.

Various tests were performed on an example of an embodiment of the RFID signal capture device 40 for the protection of a RFID device 30 in the form of various credit cards containing an RFID tag 33. Most of the preliminary testing on standard ISO 14443 and ISO 15593 cards credit cards showed that the cards could be read from as much 6 to 8 inches from the transmit antenna/coil 35 of the RFID reader 50. Hackers, however, have shown that these cards can be read from several feet away using illegal readers. Nevertheless, even FCC compliant readers can be small, portable and wireless, and will fit into a handbag or other small case, to facilitate an unauthorized interrogation to acquire critical credit card or other personal information.

Figure 16:
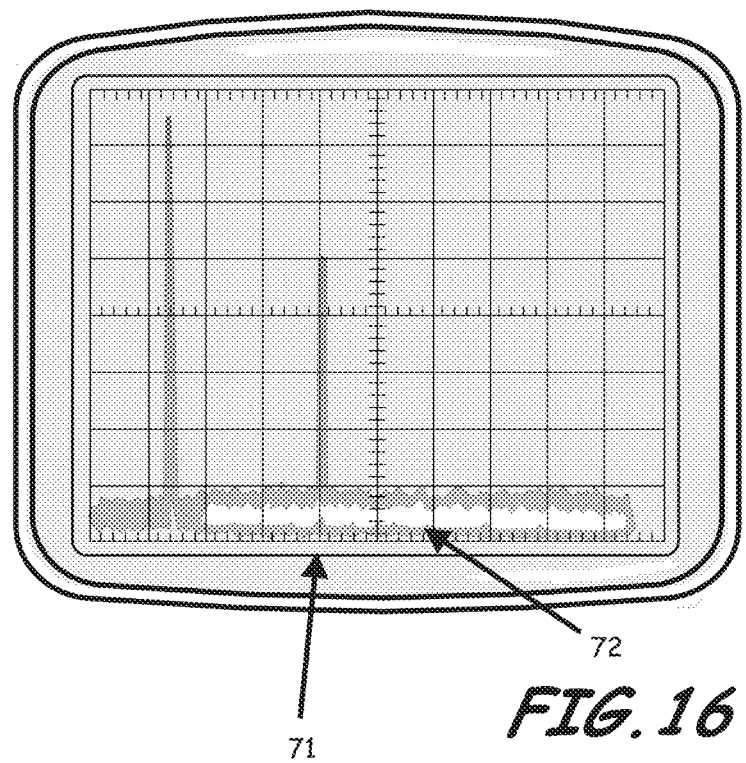
FIG. 16 is an image of a spectrum produced by an RFID reader with no RFID tags or RFID signal capture devices present.

FIG. 16 illustrates a display of a spectral analyzer showing the spectrum at 71 of a 13.56 MHz RFID reader 50, with no RFID tags 33 or RFID signal capture devices 40 present, as "seen" by a tuned instrumentation pickup test antenna (not shown) of a spectral analyzer (not shown) placed approximately 12 inches over the reader's antenna 55. The spectral analyzer was set with a center at −30 db with a −70 db full-scale to the noise, 5 MHZ per division, and with the test antenna positioned approximately 12 inches from the RFID reader 50. The noise shown at 72 around bottom of the spectrum is ambient noise. There are occasional sweeps of data as the RFID reader 50 polls for tags 33. The left most spectrum is the zero reference and the center most spectrum is the 13.56 MHz carrier of the RFID reader 50 used in the test.

Figure 7:
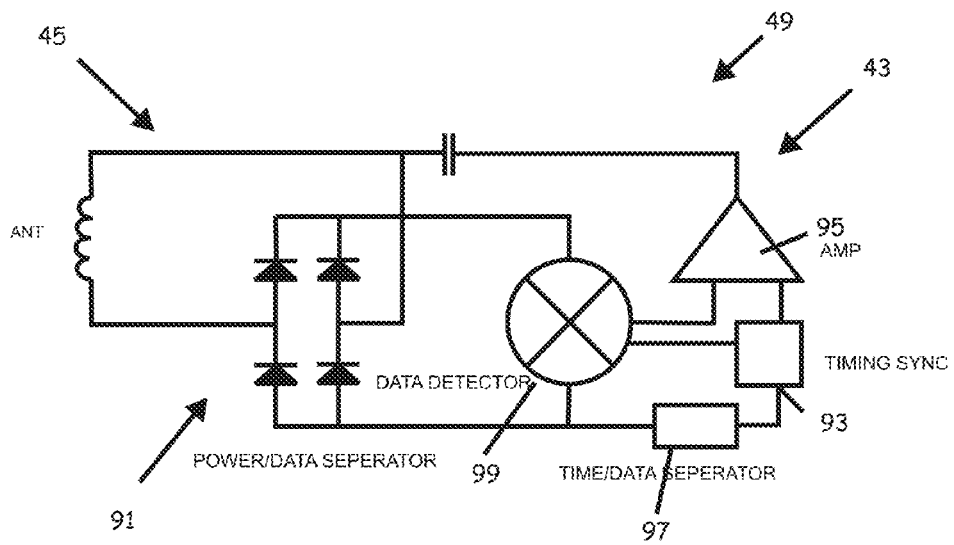
FIG. 7 is a schematic diagram of a signal capture circuit of an RFID signal capture device according to an embodiment of the present invention.
Figure 17:
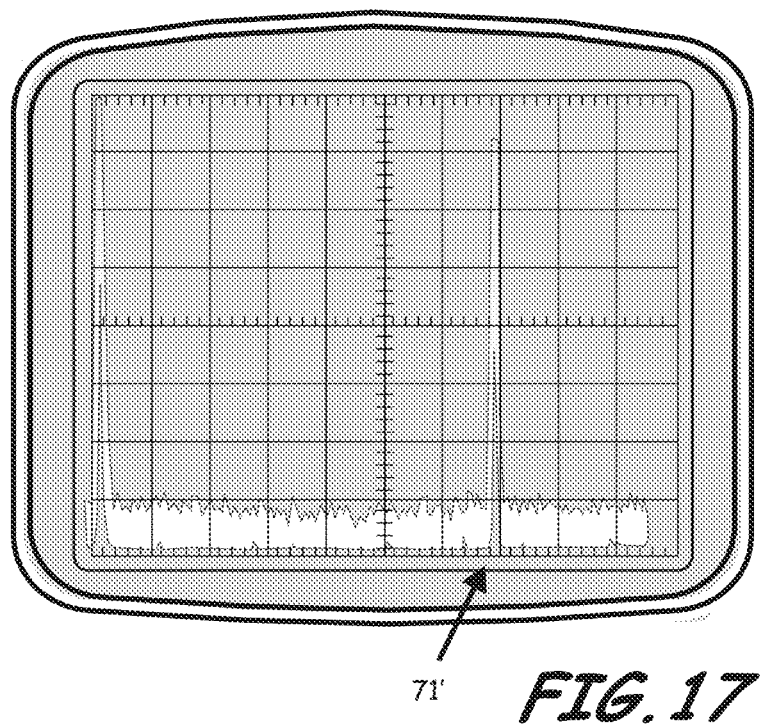
FIG. 17 is an image of a spectrum produced by an RFID reader with an RFID signal capture device positioned adjacent the RFID reader, with no RFID tags present according to an embodiment of the present invention.

FIG. 17 illustrates the spectrum shown at 71' of the RFID reader 50 with a RFID signal capture device 40 having a signal capture circuit 43 according to the configuration shown in FIG. 7, placed 2 inches from reader antenna 55, with no RFID tag 33 present. It can be seen from the displayed spectrum that the RFID signal capture device 40 did not activate in absence of an RFID tag 33.

Figure 18:
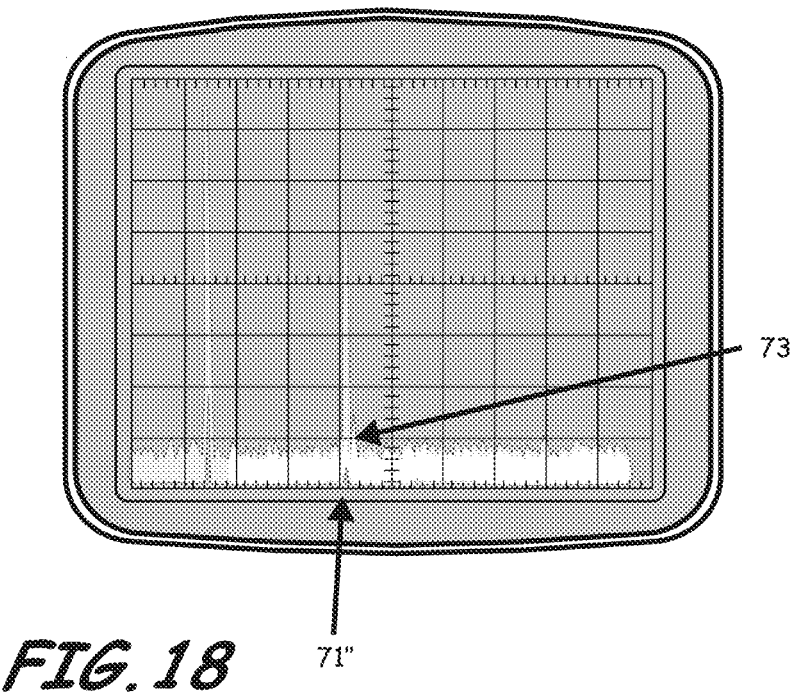
FIG. 18 is an image of a spectrum under normal read operations between an RFID reader and an RFID tag showing both carrier and data signatures.

FIG. 18 illustrates the spectrum shown at 71" of the RFID reader 50 under a normal read operation with an RFID device 30 to be protected in the form of an American Express® Blue Card containing an RFID tag 33 placed on the RFID reader 50 with the instrumentation pickup antenna (not shown) positioned adjacent to the RFID reader antenna 55. The data shown at 73 is at the base of the center-most spectrum 73 (13.56 MHz birdie).

Figure 19:
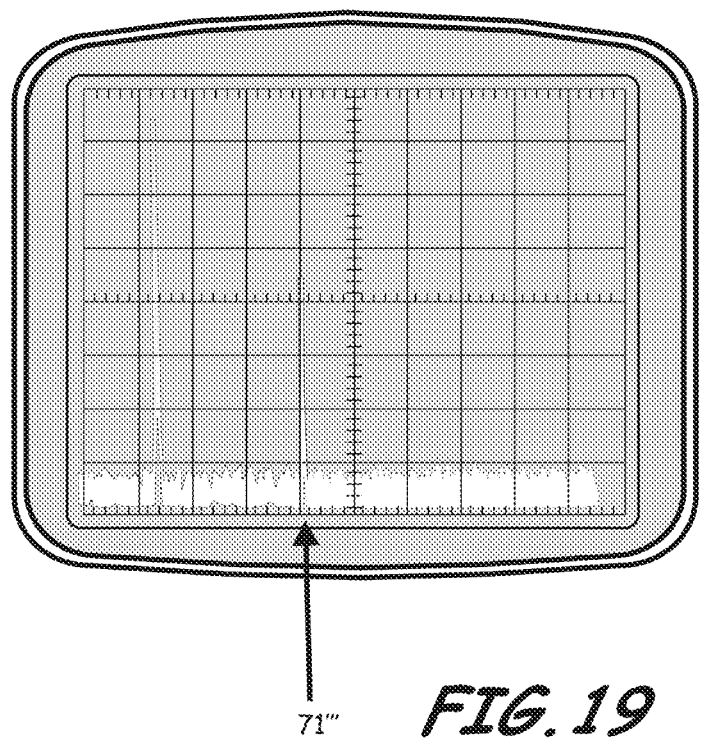
FIG. 19 is an image of a spectrum when an RFID signal capture device is placed adjacent an RFID tag during an attempted interrogation by an RFID reader according to embodiment of the present invention.

FIG. 19 illustrates the spectrum shown at 71''' when the RFID signal capture device 40 is placed on the RFID test device 30 including RFID tag 33. It can be seen that no successful data transfer is present when the RFID signal capture device 40 is next to the RFID device 30 under test (American Express® Blue Card).

Figure 20:
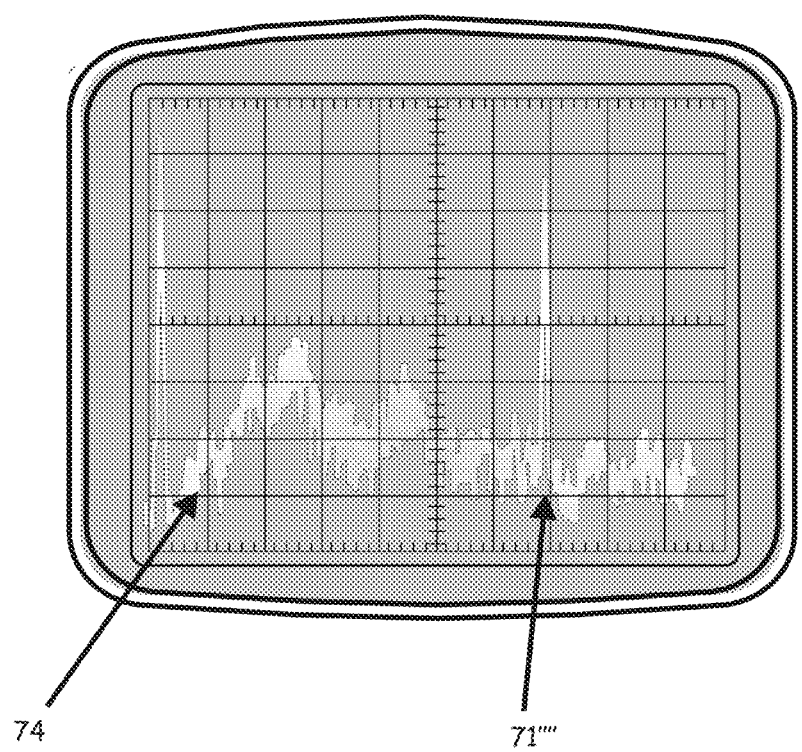
FIG. 20 is an image of a spectrum when an RFID signal capture device and test instrument antenna is placed adjacent an RFID tag during an attempted interrogation by an RFID reader, resulting in a parasitic oscillation.

FIG. 20 illustrates the spectrum shown at 71'''' when the RFID signal capture device 40 and the RFID device 30 under test (containing an RFID tag 33) are placed together with the RFID reader antenna 55 and instrumentation pickup antenna (tuned sampling antenna). The result is parasitic oscillation shown at 74, which are no longer present when the devices 30, 40, are moved approximate 2 inches away from the RFID reader 50, so that the RFID signal capture device 40 cannot couple with the RFID reader antenna 55. Note, the parasitic oscillation may further be the result of the instrumentation pickup antenna being in close proximity to the RFID signal capture device 40.

In summary, it was shown by the testing that the signals created by the RFID signal capture device 40 are parasitic to the RFID tag 33 of the RFID device 30 under test, at least partially as a result of capturing the data signal between the RFID tag 33 and the RFID reader 50 in order to phase cancel the carrier. During the test, the data signals consistently registered at −30 db below the normal signal level of the 13.56 MHz carrier, with a bandwidth of about 1 MHz. The data shown on the display of the spectrum analyzer is from the powered RFID reader 50 and not the RFID tag 33 of the device 30 under test. The signal levels of the RFID tag 33 and the RFID signal capture device 40 (both passive) are so low that they could not be seen without placing the instrumentation pickup antenna directly on top of the devices 30, 40. The addition of a tuned coil antenna into the coupled field caused the signal displayed on the spectrum analyzer to oscillate (over-sample).

As identified previously, the RFID signal capture circuit 43 for the RFID signal capture device 40 is specifically designed to effectively prevent data transfer between an RFID tag (transponder) 33 of an RFID device 30 and a RFID reader 50 attempting an unauthorized interrogation of data from the tag 33, when positioned in close contact with the RFID device 30, to thereby perform various privacy functions including the prevention of unauthorized data access and/or the prevention of tracking the movement of the user of the RFID device 30, while allowing access when not positioned in close contact. To accomplish such functions, the circuit 43 is generally configured: to mutually inductively couple with the RFID tag (or tags) 33 when positioned in close proximity thereto and when the RFID reader 50 is producing an interrogation signal; to mutually inductively couple with the RFID reader 50 when positioned in close proximity to the RFID tag 33 (or at least one of the tags 33, but typically all of the tags 33, if simultaneously protecting multiple tags 33) when the RFID reader 50 is producing an interrogation signal; to mutually inductively couple with the RFID tag or tags 33 when positioned in close proximity to the RFID tag or tags 33 and when the respective RFID tag or tags 33 are producing a reply to interrogation signal in the presence of the RFID reader 50; and to remain inert when not positioned in close proximity to the RFID device (or devices) 30 carrying the RFID tag or tags 33 to not interfere with operation of the RFID reader 50 or the RFID tag or tags 33, i.e., in order to allow the RFID reader 50 to conduct a transaction with the RFID device 30 or a selected one of the RFID devices 30. In order to remain inert when not positioned in close proximity to the RFID device (or devices) 30, beneficially, the device 40 can be configured to have no tuned circuit on the antenna/assembly 45, resulting in a requirement for the device 40 to be inductively coupled with an RFID tag 33 of an RFID device 30 in order to be activated.

FIG. 7 illustrates an example of an embodiment of the RFID signal capture circuit 43 carried by the body 41 of the RFID signal capture device 40 (which can function as a container for the circuit 43). The illustrated RFID signal capture circuit 43 includes a signal capture circuit antenna/assembly 45 as understood by those skilled in the art, positioned to receive an interrogation signal including an interrogation carrier signal carrying a data signal from the RFID reader 50, and a signal processing portion 49 operably coupled thereto. When configured in the form of a passive or partially passive circuit, the signal processing portion 49 of the signal capture circuit 43 can include a voltage rectifier power/data separator, e.g., voltage rectifier 91, as understood by those skilled in the art, positioned to provide operational power to the remainder of the signal processing portion 49 responsive to the interrogation signal. In this configuration, the voltage rectifier 91 is normally in the form of a full wave rectifier to provide the maximum amount of power in the minimum amount of RFID reader signal transmission time. Further, according to a preferred configuration, the circuit 43 does not include a battery or other long-term storage device to power the signal capture circuit 43, and thus, will not transmit without receiving energy from an interrogation signal when coupled with the RFID tag 33.

The signal processing portion 49 of the signal capture circuit 43 can further include a timing synchronizer 93 as would be understood by those skilled in the art, positioned to return a modified carrier signal responsive to the interrogation signal. The modified carrier signal can include a phase-adjusted carrier signal generated in response to the interrogation signal, and/or a synchronized carrier signal generated in response to the interrogation signal, for transmission as either a synchronized signal or phase adjusted signal, for example, by a transistor or amplifier 95 as would be understood by those skilled in the art, coupled with the antenna/assembly 45. When provided as a phase-shifted carrier signal, the phase-shifted carrier signal returned by the timing synchronizer 93 can have a phase shift of at least approximately 90 degrees to that of the interrogation carrier signal, but preferably has a phase shift of approximately 180 degrees, to effectively cancel or at least severely disrupt any attempt by the RFID reader 50 to transfer data to the RFID tag 33.

The signal capture circuit 43 can further include a time/data separator 97 as would be understood by those skilled in the art, positioned to separate the data signal from the interrogation signal to provide the timing synchronizer 93 a timing reference to the interrogation carrier signal to facilitate the phase adjustment and/or synchronization, and a data detector 99 as would be understood by those skilled in the art, positioned to provide the data signal to the timing synchronizer 93 and positioned to facilitate data modulation of the phase-adjusted carrier signal and/or data modulation of the synchronized carrier signal. Beneficially, the data modulated signal can have a different data signal than the data signal received from the RFID reader 50 to thereby further effectively prevent data transfer between the RFID tag 33 and the RFID reader 50. Note, it should be understood by one skilled in the art that although shown as separate functional components, various methodologies of implementing voltage rectifier 91, timing synchronizer 93, transistor or amplifier 95, time/data separator 97, and data detector 99, to include implementation as either separate modules or a single module, is within the scope of the illustrated embodiment of the present invention.

As noted previously, beneficially, the data modulation can include frequency-based data modulation, phase-based data modulation, amplitude-based data modulation, and others known to those skilled in the art, provided to prevent/disrupt the RFID tag 33 from being able to receive or understand a transmission from the RFID reader 50 via the RFID reader circuit 53, and to prevent/disrupt the RFID reader 50 from being able to receive or understand a transmission from the RFID tag 33 if the transmission from the RFID reader circuit 53 was received by the RFID tag 33. Various methods of providing preventive or disruptive phase modulation of the carrier frequency were described above. Preventive or disruptive frequency modulation can be provided by modulating a synchronized carrier frequency to provide different data, such as, for example, random data, or data specifically at odds with the data detected by data detector 99. According to an embodiment of the signal capture circuit 43, both phase and frequency modulation can be simultaneously provided. Note, although the terminology phase modulation and frequency modulation are used, one skilled in the art should understand that such terminology refers to both analog modulation in its various forms, and digital modulation (e.g., phase shift keying, frequency shift keying) in its various forms.

Similarly, preventive or disruptive amplitude modulation in its various forms can be provided by either randomly adjusting the amplitude or adjusting the amplitude based on the data recognized, for example, by the data detector 99. The carrier produced by the RFID reader circuit 53 of the RFID reader 50 produces an AC voltage that is generated by the LC circuit combination of the RFID tag 33 and in the signal capture circuit 43 when inductively coupled with the RFID tag 33 via the signal capture circuit antenna/assembly 45. This voltage is rectified by the voltage rectifier 91 to provide DC voltage to power the rest of the signal capture circuit 43. Note, the analog modulation can be simultaneously provided with phase modulation, frequency modulation, or both.

Figure 8:
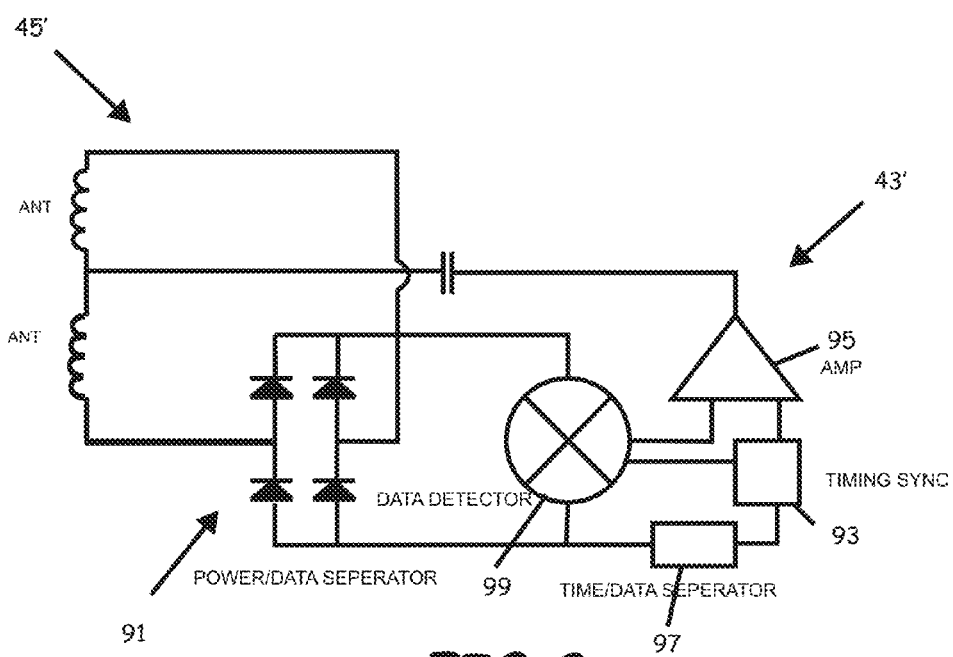
FIG. 8 is a schematic diagram of a signal capture circuit of an RFID signal capture device according to an embodiment of the present invention.

In amplitude shift keying, for example, a transistor or amplifier/amplifier module 95 manipulates the amplitude of the signal to create a logical "one" or "zero." One methodology of amplitude shift keying can include application of a circuit 43' having a tapped antenna coil/assembly 45' as shown, for example, in FIG. 8, connected to a modulation transistor or amplifier 95 so that when the circuit is "on," it effectively lowers the inductance of the antenna coil/assembly 45'. According to this exemplary methodology, when the signal capture circuit 43' is "off," the RFID tag 33 "sees" an inductance and capacitance in parallel tuned to 13.56 MHz in this example. As the data is sent to the RFID tag 33 by the RFID reader circuit 53 of the RFID reader 50, however, the signal capture circuit 43' turns "on" and "off" to produce false data. That is, in this example, when a signal from the RFID reader circuit 53 is applied to the signal capture circuit 43' and the circuit 43' is positioned in close proximity to the RFID tag 33, the LC circuit is tuned and detuned continuously at a rate equal to the frequency of the controlling signal. This control signal is used to alter the data detected in the RFID reader circuit 53 as the amplitude-modulated form of the carrier. If of sufficient strength to be detected by the RFID tag 33, the data detector used by the RFID tag 33 demodulates this false signal to try to extract information being sent from the RFID reader 50, which results in a communication failure between the RFID reader 50 and the RFID device 30.

Another protection methodology that can be employed in conjunction with or as an alternative to the above described modulation forms includes using the carrier frequency of the RFID reader 50 to generate a harmonic frequency, e.g., 6.78 MHz and/or 27.12 MHz for a 13.56 MHz carrier, that is, for example, approximately 70 percent or more in field strength to that of the carrier frequency as seen by the RFID tag 33. This harmonic can be radiated so that the data and timing present on the carrier frequency of the RFID reader 50 are disrupted to the extent that the RFID reader/interrogator 50 is unable to communicate with the protected RFID device 30. That is, since the RFID tag 33 of the RFID device 30 cannot receive the data transmissions, it cannot communicate.

Figure 21:
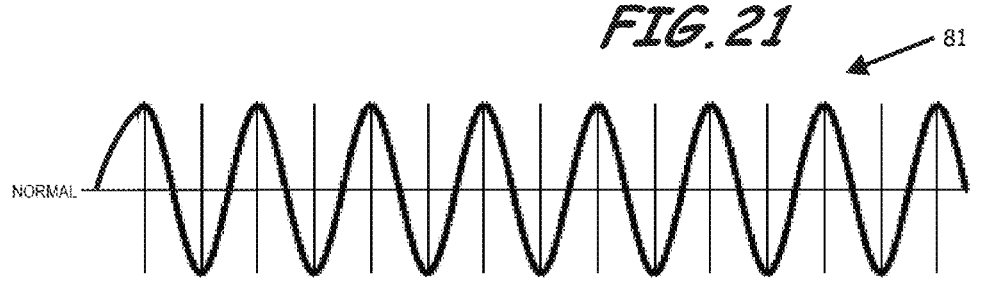
FIG. 21 is a schematic diagram of a carrier wave emanating from an RFID reader during normal operations.
Figure 22:
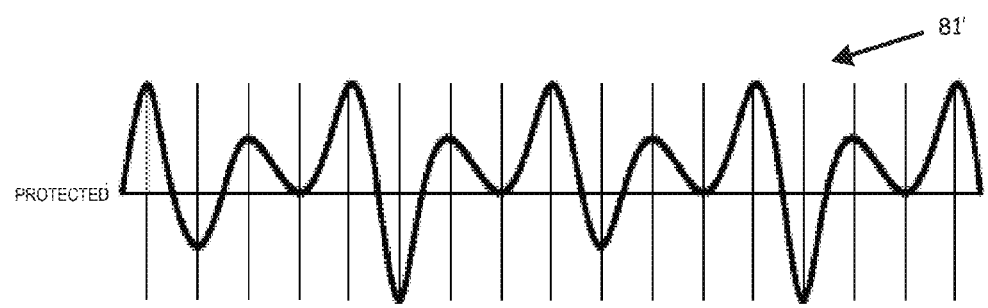
FIG. 22 is a schematic diagram of an example representation of the carrier wave of FIG. 21 being phase and amplitude adjusted as a result of positioning the RFID signal capture device in close proximity to the RFID tag according to an embodiment of the present invention.
Figure 23:
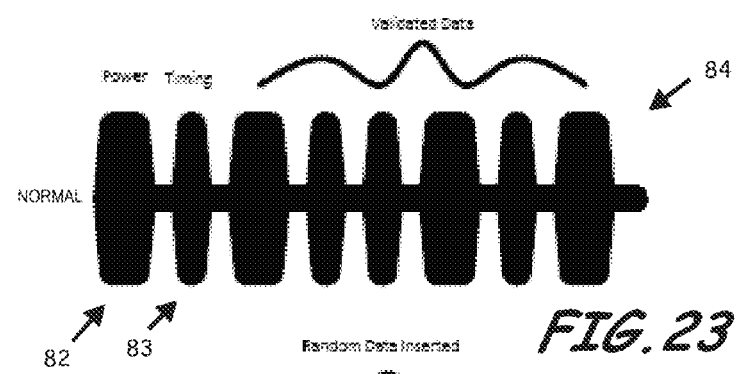
FIG. 23 is a schematic diagram of a data signal emanating from an RFID reader during normal operations.

FIGS. 21-24 comparatively illustrate the functioning of the signal capture circuit 43 shown, for example, in FIG. 7. FIG. 21, for example, illustrates a generic example representation of a carrier wave shown at 81 as seen by an RFID tag, e.g., RFID tag 33, which would emanate from the RFID reader 50, and FIG. 23 illustrates an example of the power, timing, and data signals from the RFID reader 50 shown at 82, 83, and 84, respectively. Specifically, FIG. 23 illustrates that an initial portion of the signal from the RFID reader 50 (power portion at 82) would be utilized by a passive RFID tag, e.g. RFID tag 33, to obtain power to begin functioning, followed by a timing portion of the signal at 83, further followed by a validated data portion of the signal at 84, which the RFID tag 33 would need to receive in order to respond to the interrogation.

Figure 24:
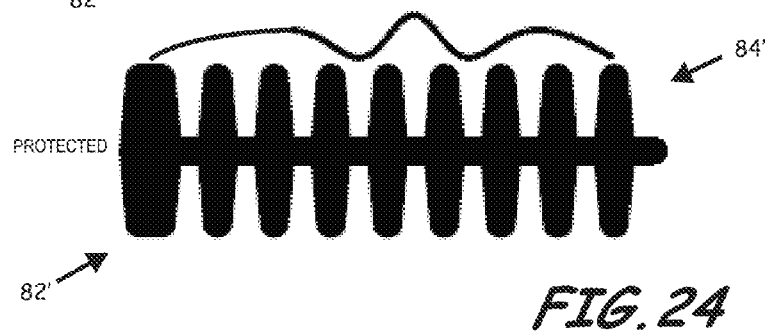
FIG. 24 is a schematic diagram of an example representation of the data signal of FIG. 23 being phase and amplitude adjusted as a result of positioning the RFID signal capture device in close proximity to the RFID tag according to an embodiment of the present invention.

FIG. 22 comparatively illustrates an example representation shown at 81' of the carrier wave 81 of FIG. 21 being phase and amplitude adjusted as a result of positioning the RFID signal capture device 40 in close proximity to the RFID tag 33, and FIG. 24 comparatively illustrates the insertion of random data shown at 84' beginning during transmission of the "power" signal shown at 82' which affects both the timing and the data signals, thus preventing tag 33 recognizing any data provided by the RFID reader 50 when the RFID signal capture device 40 in close proximity to the RFID tag 33.

Figure 9:
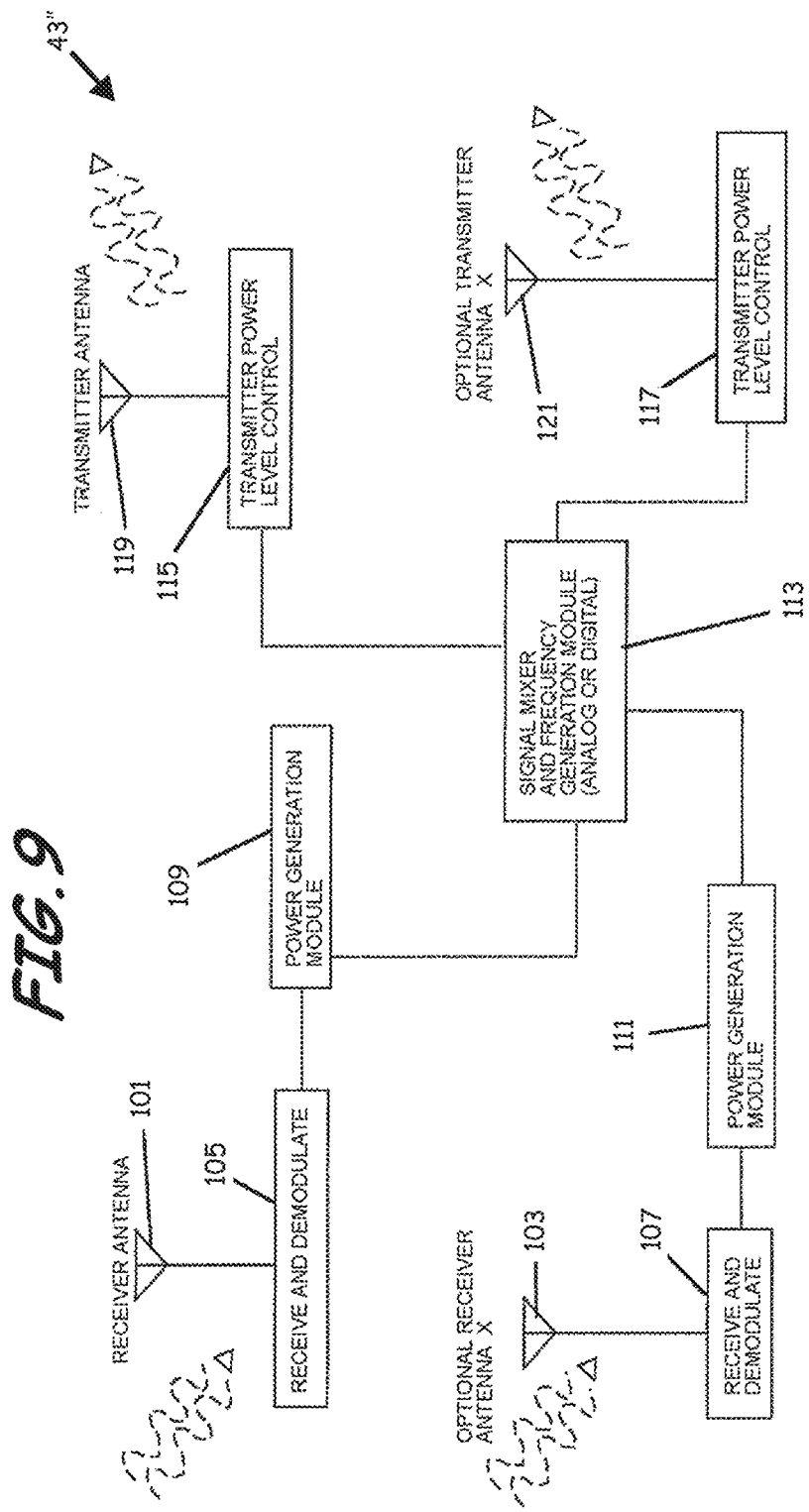
FIG. 9 is a schematic diagram of a signal capture circuit of an RFID signal capture device according to an embodiment of the present invention.

FIG. 9 illustrates another example of an embodiment of the RFID signal capture circuit 43" that can be carried by the body 41 of the RFID signal capture device 40. The illustrated RFID signal capture circuit 43" can include one or more receiver antennas 101, 103, as understood by those skilled in the art, to assist in receiving RFID interrogation signals, a receiver and demodulator 105, 107 to demodulate a received interrogation signal, a power generator module 109, 111, as would be understood by those skilled in the art, to generate power for the RFID signal capture circuit 43" responsive to the received interrogation signal, and a signal mixer and frequency generation module (analog or digital) 113, as would be understood by those skilled in the art, to mix received signals and generate a frequency signal as understood by those skilled in the art. The circuit 43" can also include, for example, a transmitter power level controller 115, 117 and one or more transmitter antennas 119, 121 to assist with the transmission of the blocking RF fields or zones, as would be understood by those skilled in the art.

An embodiment similar to that of the RFID signal capture circuit 43" described above, can functionally include an incoming signal detector to detect incoming signals from the unauthorized RFID interrogation device or other form of RFID reader 50, an incoming signal demodulator to demodulate a detected incoming signal, and an RFID signal disruptor or disruptor circuit configured to respond to the RFID reader 50 with disrupting read signals responsive to the incoming signal, as would be understood by those skilled in the art. The RFID signal disruptor circuit can include various configurations, one of which includes an RFID signal generator as would be understood by those skilled in the art, to generate an RFID signal at the same data rate as the demodulated signal to thereby disrupt the RFID device's ability to communicate with the unauthorized interrogation device or reader 50.

Another similar embodiment of an RFID signal capture device 43" can functionally include an incoming signal detector to detect incoming signals from the unauthorized RFID interrogation device or reader 50 and an RFID interferer configured to interfere with activation or operation ability of the RFID tag 33 of each separate RFID device (or devices) 30 as would be understood by those skilled in the art, responsive to the incoming signal detector so that the RFID reader 50 cannot properly read or have access to information on the RFID device or devices 30. The RFID interferer can also interfere with the RFID device (or devices) 30 (including those having an anti-collision protocol) so that the anti-collision protocol fails to activate.

Alternatively, for example, for an RFID device (or devices) 30 including an anti-collision protocol as understood by those skilled in the art, the RFID interferer interferes with a product of the anti-collision protocol of the separate RFID device (or devices) 30 when being transmitted to the unauthorized RFID reader 50. The RFID interferer, for example, can include a frequency shift generator as would be understood by those skilled in the art, to generate a frequency shift above and below a center frequency of an RFID communication link to each separate RFID device 30.

Figure 10:
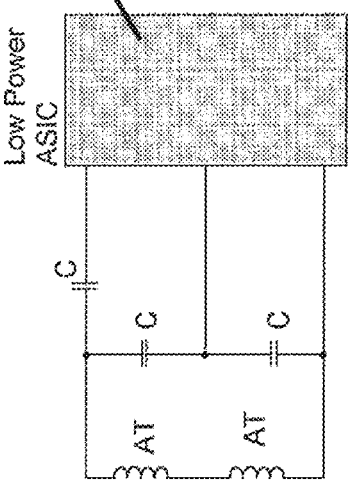
FIG. 10 is a schematic diagram of a signal capture circuit of an RFID signal capture device according to an embodiment of the present invention.
Figure 11A:
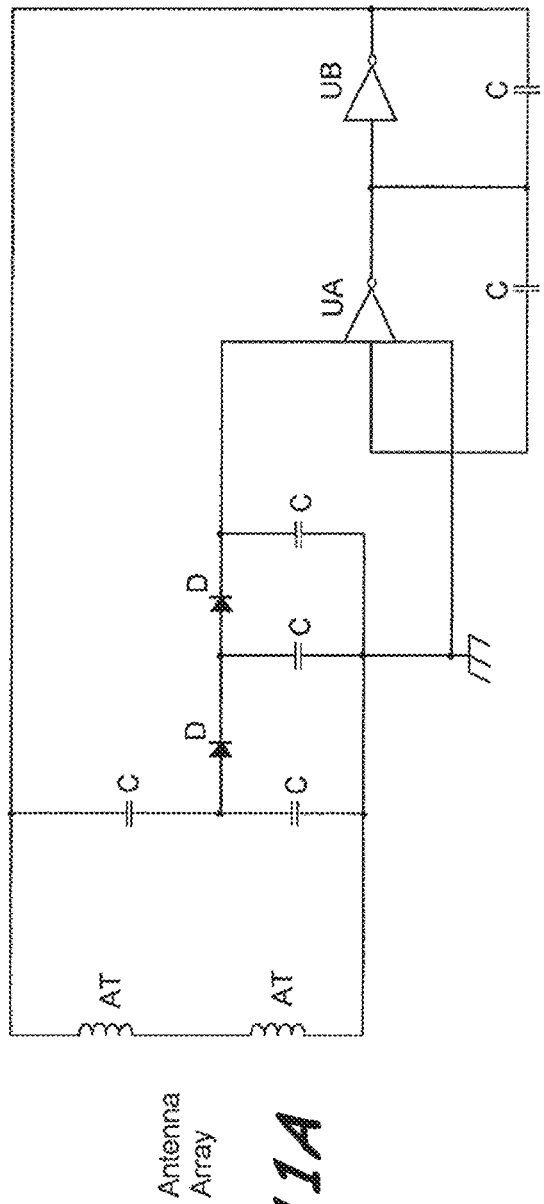
FIG. 11A is a schematic diagram of a signal capture circuit of an RFID signal capture device according to an embodiment of the present invention.

FIGS. 10-11A illustrate two examples of more detailed antenna arrays (or inductors), capacitors, diodes, and amplifiers arranged as understood by those skilled in the art to prevent data transfer between the RFID reader 50 and the RFID device 30. For example, as understood by those skilled in the art, the signal capture circuit 43, 43', 43", can be in the form of an application specific integrated circuit (ASIC) 131 used to interface and respond to an antenna array in a low power design such as shown in FIG. 10. The low power ASIC 131 can have digital sampling to detect incoming signals from the RFID reader 50 or other interrogation device, and can use various signal generation or frequency generation techniques as understood by those skilled in the art to respond with disruptive patterns.

As understood by those skilled in the art, and as noted above, RFID tags 33 or other circuitry or chips carried by the RFID device 30 often have an anti-collision protocol or program that allow multiple chips to talk to a reader 50. Similarly, the RFID reader circuit 53 may be configured with an anti-collision protocol which can cause the RFID reader 50 to slightly off-tune to acquire the signal from an off-tuned RFID tag 33. Beneficially, the above described techniques can generate an interference with the ability of each RFID tag 33 to activate its onboard anti-collision protocol(s). Depending on the desires of the user of the RFID signal capture device 40: the anti-collision protocol(s) can be stopped before activation; the product or result of the protocol can be attacked or interfaced with during generation or transmission; or both. A frequency, phase, or amplitude shift generation, for example, above and/or below a center frequency of an RFID communication link, can be produced by the signal capture circuit to perform search functions.

Alternatively, an analog or discrete design, such as that shown in FIG. 11A, can demodulate the incoming signal from the interrogation device(s), then broadcast back out at that data rate to suppress the ability of the RFID tag 33 of each RFID device 30 to communicate.

As understood by those skilled in the art, the signal capture circuit 43, 43', 43", could be in the form of individual component die, or the commercially available component packages (SOT-23, SMB, etc.), used to interface and respond to an antenna array as shown in FIGS. 11A-11H. Additionally, these analog based interference techniques could be packaged as a single Analog ASIC package for ease of mass production manufacturing techniques.

FIGS. 11A-11J illustrate examples of a signal disruptor circuit which can be stored in a container such as, for example, a plastic card 41, wallet/purse 141, passport card, etc.

Figure 11B:
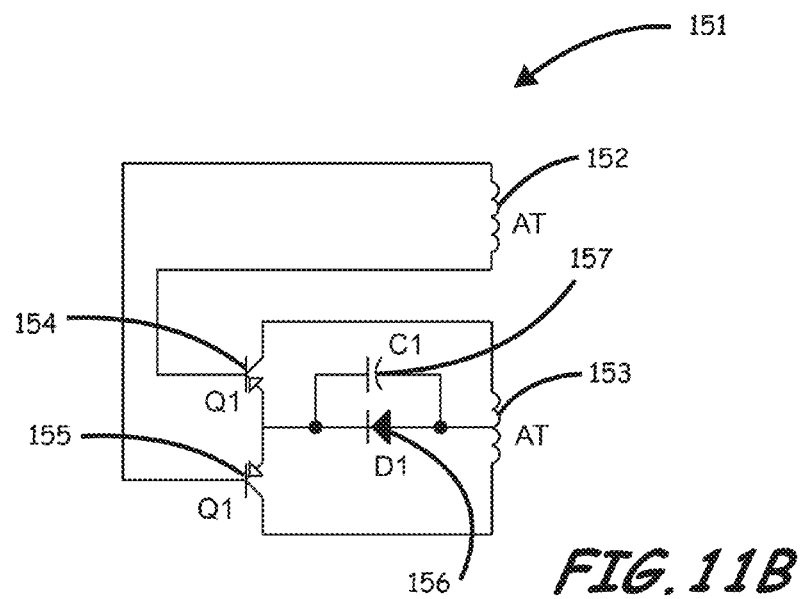
FIG. 11B is a schematic diagram of a signal disruptor circuit of an RFID signal disruptor device according to an embodiment of the present invention.

FIG. 11B illustrates a signal disruptor circuit 151 which includes a first antenna 152 primarily for receiving an interrogation signal, a second antenna 153 primarily for transmitting a disruptive signal, transistors 154, 155 (e.g., PNP bipolar junction transistors), and a diode 156 in parallel with a capacitor 157 jointly connected between the emitters of the transistors 154, 155 and a tap in the second antenna 153.

Figure 11C:
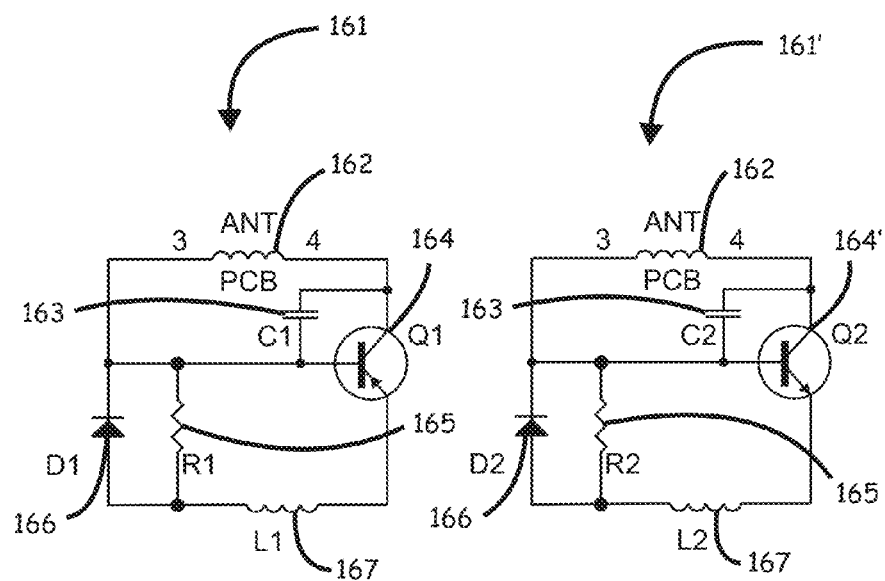
FIG. 11C is a schematic diagram of a pair of signal disruptor circuits of an RFID signal disruptor device according to an embodiment of the present invention.

FIG. 11C illustrates an example of a pair of signal disruptor circuits 161, 161', configured to produce signals that are 180° out of phase to be used independently or by a signal mixer (not shown) to enhance disruption of an unauthorized RFID interrogation. Each circuit can include an antenna 162 for receiving portions of the unauthorized RFID interrogation signal, a capacitor 163 positioned in parallel with the antenna 162, a transistor 164, 164', to provide high-speed switching with minimal propagation delay between the incoming interrogation signal and the outgoing disrupting signal, and a resistor 165 in parallel with a diode 166 to stabilize the base voltage of the transistor 164, 164'. Each circuit can also include an inductor 167 provided to regulate current to feed the transistor 164, 164', as it switches the disruptive signal onto the antenna.

Figure 11D:
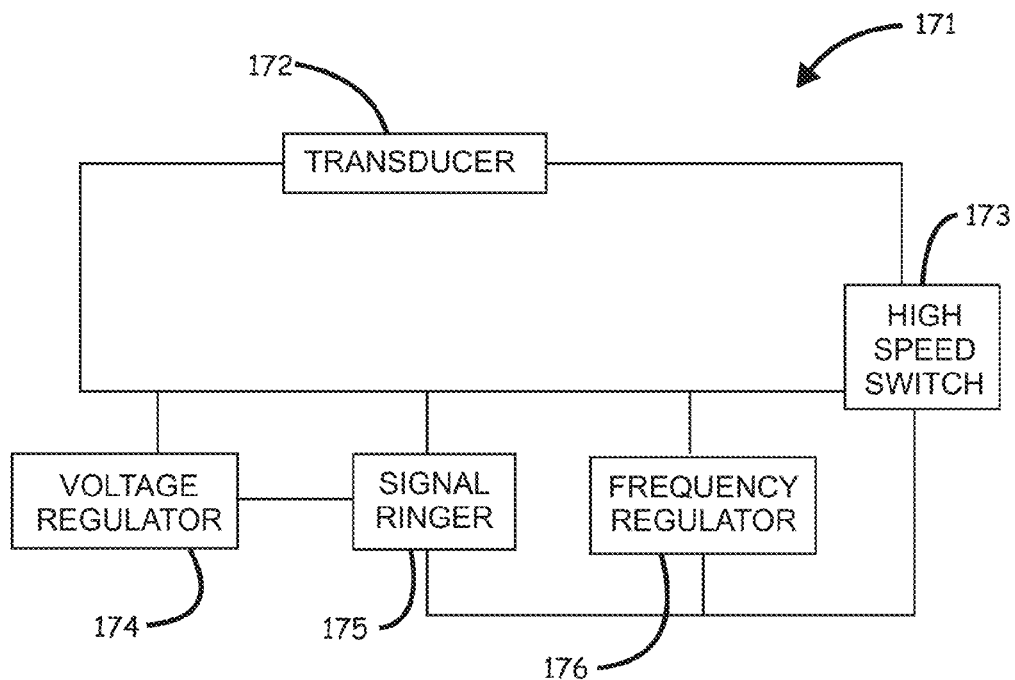
FIG. 11D is a schematic block diagram of a signal disruptor circuit of an RFID signal disruptor device according to an embodiment of the present invention.
Figure 11E:
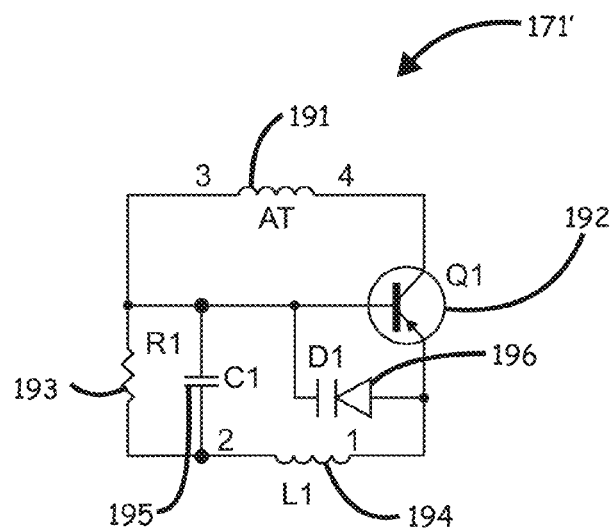
FIG. 11E is a schematic diagram of a signal disruptor circuit of an RFID signal disruptor device according to an embodiment of the present invention.

FIG. 11D and FIGS. 11F-11H and 11I illustrate block diagrams of a set of signal disruptor circuit examples. FIG. 11E illustrates a practical signal disruptor circuit 171' example of the RFID signal disruptor circuit 171 (FIG. 11D). As shown in FIG. 11D, a signal disruptor circuit 171 includes a transducer 172, a high-speed switch 173, a voltage regulator 174, a signal ringer/inductor 175, and a frequency regulator 176.

The transducer 172 can include, for example, an RFID antenna 191 (see, e.g., FIG. 11E) typically positioned in a single plane or pair of planes.

The high-speed switch 173 can include, for example, a single transistor 192 (see, e.g., FIG. 11E) or relatively small set of transistors to provide high switching speeds, sufficient to minimize the propagation delay between the received unauthorized RFID interrogation signal and the disrupting signal such that the disrupting signal remains effective in preventing the communication of usable data from one or more adjacent RFID devices 33 to be protected. According to an exemplary embodiment, the high-speed switch 173 has a responsiveness of typically less than between approximately 10 μs and 0.1 μs, but more typically approximately 1 μs. According to an embodiment, the transistor 192 according to an exemplary configuration is rated to consistently switch signals in the operational frequency of 200 Mhz over a broad voltage range. According to another exemplary configuration, a 7400 series gate is rated to switch in the operational frequency range of 40 Mhz at low voltages and 100 Mhz at higher voltages. The voltage being generated in the RFID signal disruptor circuit 171, 171' can vary significantly while the disruptor device is powering up for operation within the RFID field.

The voltage regulator 174 can include, for example, resistor 193 (see, e.g., FIG. 11E) positioned to stabilize base voltage of the transistor 192 to thereby consistently drive the transistor 192 or other switch over a range of voltages associated with the received RFID interrogation signal. A resistor is designed to resist a change in voltage in the circuit. According to an exemplary configuration, the resistor 193 is employed to stabilize the base voltage of the transistor 192 in order to consistently drive the transistor even as the field generated voltages vary.

The signal ringer 175 can include or consist of, for example, a wound inductor 194 (see, e.g., FIG. 11E) positioned in the circuit to cause signal ringing as understood by one of ordinary skill in the art in response to the received portions of the RFID interrogation signal. A wound inductor 194 is designed to resist a change in current in a circuit. According to an exemplary configuration, the inductor 194 acts as a current regulator to feed the transistor 192 as it switches the disruptive signal onto the antenna 191. The inductor will generally not substantially regulate the voltage across the transistor 192, therefore voltage spikes are regularly generated which provide a "ringing" effect of an oscillation. To assist in the isolation, the signal ringer 174 can also incorporate capacitor 195 and/or parasitic capacitance included in the other circuit components.

The frequency regulator 176 can include or consist of, for example, a diode 196 such as, for example, a varactor (varicap) diode (see, e.g., FIG. 11E) to help control the frequency characteristics of the disruptive signal. Particularly, in an exemplary configuration, the diode 196 assists in tuning the signal disruptor circuit 171, 171', for different frequencies and allows for protection directed to multiple interrogation frequencies with the same signal disruptor device.

Figure 11F:
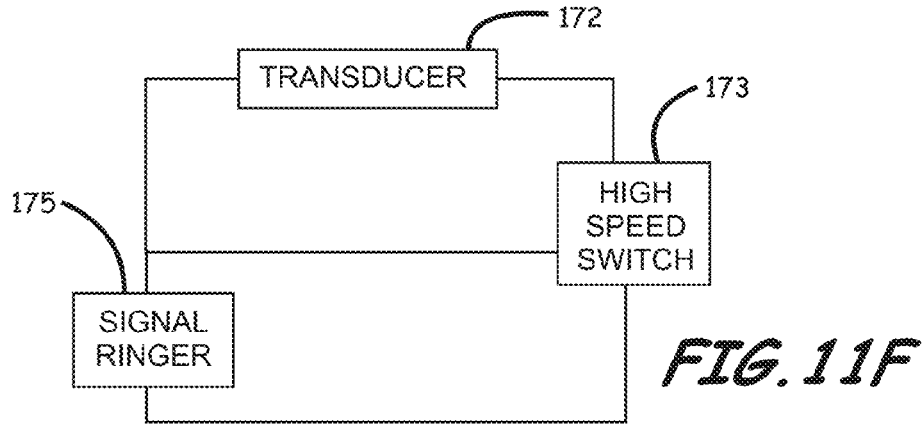
FIGS. 11F-11I are schematic block diagrams of variations of the signal disruptor circuit of an RFID signal disruptor device of FIG. 11D according to an embodiment of the present invention.
Figure 11G:
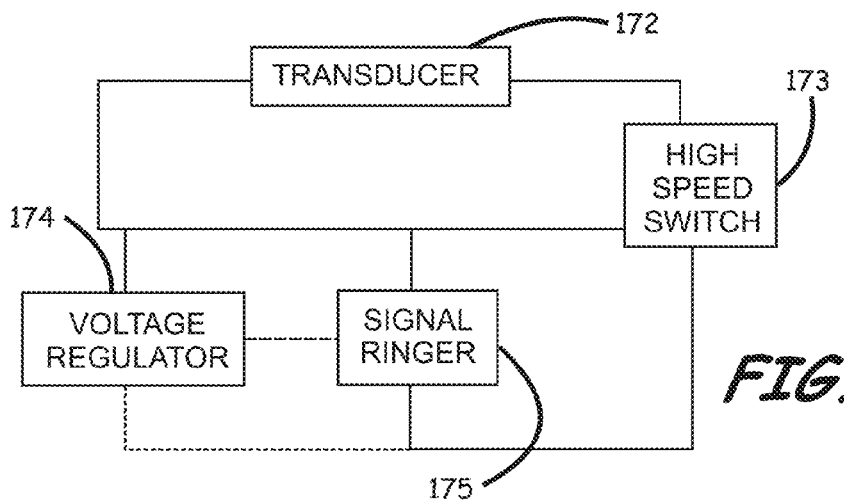
Figure 11H:
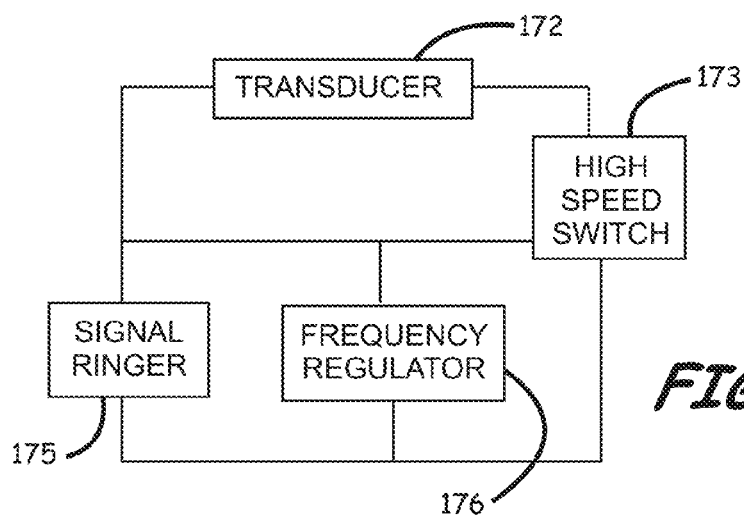

FIGS. 11F-11H illustrate variations of the RFID signal disruptor circuit 171 according to various configurations.

Figure 11I:
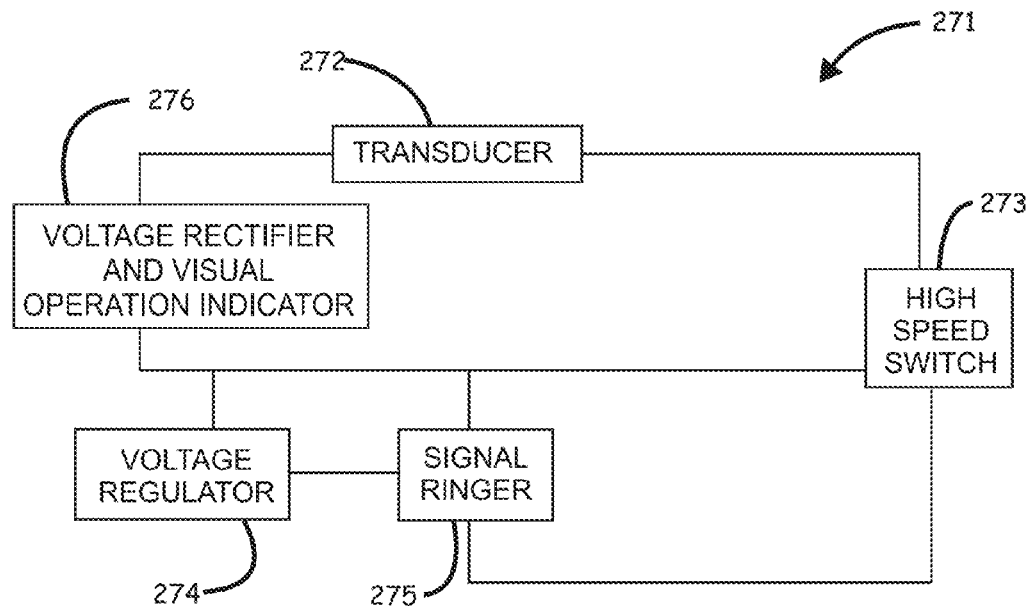
Figure 11J:
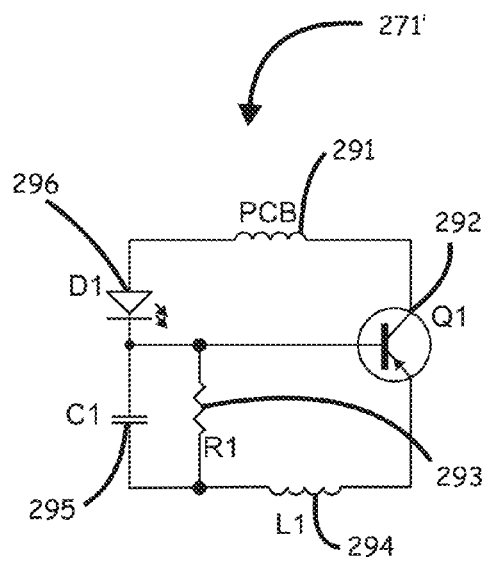
FIG. 11J is a schematic diagram of a signal disruptor circuit of an RFID signal disruptor device according to an embodiment of the present invention.

FIG. 11J illustrates a practical RFID signal disruptor circuit 271' example of the RFID signal disruptor circuit 271 (FIG. 11I). As shown in FIG. 11I, a signal disruptor circuit 271 includes a transducer 272, a high-speed switch 273, a voltage regulator 274, a signal ringer/inductor 275, and a voltage rectifier and visual operation indicator 276.

The transducer 272 can include, for example, an RFID antenna 291 (see, e.g., FIG. 11J) typically positioned in a single plane or pair of planes.

The high-speed switch 273 can include, for example, a single transistor 292 (see, e.g., FIG. 11J) or relatively small set of transistors to provide high switching speeds, sufficient to minimize the propagation delay between the received unauthorized RFID interrogation signal and the disrupting signal such that the disrupting signal remains effective in preventing the communication of usable data from one or more adjacent RFID devices 33 to be protected. According to an exemplary embodiment, the high-speed switch 273 has a responsiveness of typically less than between approximately 10 μs and 0.1 μs, but more typically approximately 1 μs. According to an embodiment, the transistor 292 according to an exemplary configuration is rated to consistently switch signals in the operational frequency of 200 Mhz over a broad voltage range. According to another exemplary configuration, a 7400 series gate is rated to switch in the operational frequency range of 40 Mhz at low voltages and 100 Mhz at higher voltages. The voltage being generated in the RFID signal disruptor circuit 271, 271' can vary significantly while the disruptor device is powering up for operation within the RFID field.

The voltage regulator 274 can include, for example, resistor 293 (see, e.g., FIG. 11J) positioned to stabilize base voltage of the transistor 292 to thereby consistently drive the transistor 292 or other switch over a range of voltages associated with the received RFID interrogation signal. A resistor is designed to resist a change in voltage in the circuit. According to an exemplary configuration, the resistor 293 is employed to stabilize the base voltage of the transistor 292 in order to consistently drive the transistor even as the field generated voltages vary.

The signal ringer 275 can include or consist of, for example, a wound inductor 294 (see, e.g., FIG. 11J) positioned in the circuit to cause signal ringing as understood by one of ordinary skill in the art in response to the received portions of the RFID interrogation signal. A wound inductor 294 is designed to resist a change in current in a circuit. According to an exemplary configuration, the inductor 294 acts as a current regulator to feed the transistor 292 as it switches the disruptive signal onto the antenna 291. The inductor will generally not substantially regulate the voltage across the transistor 292, therefore voltage spikes are regularly generated which provide a "ringing" effect of an oscillation. To assist in the isolation, the signal ringer 274 can also incorporate capacitor 295 and/or parasitic capacitance included in the other circuit components.

The voltage rectifier and visual operation indicator 276 can include or consist of, for example, a diode such as, for example, a light emitting diode 296 (see, e.g., FIG. 11J) or other visual indicator as understood by those skilled in the art. The voltage rectifier and visual operation indicator 276 can be positioned within the circuit to help maintain a DC voltage in the circuit, for example, via voltage rectification, resetting after each phase shift. Additionally, the voltage rectifier and visual operation indicator 276 can also or alternatively provide a visual indication (alert) to the user of the RFID device 30 of the presence of an interrogation signal; i.e., an indication that the RFID reader 50 is attempting to interrogate the RFID tag 33 when the RFID signal disruptor circuit 271, 271' is positioned in close proximity to the RFID tag 33, sufficient to allow mutual inductive coupling therebetween, when the RFID reader 50, 50' is producing an interrogation signal within activation range of the RFID tag 33. Beneficially, the voltage rectifier and visual operation indicator 276 when included in the RFID signal disruptor circuit 271, 271' can perform the function of visual warning circuit 63 (FIG. 15), described previously, but in a single RFID signal disruptor circuit arrangement.

As understood by those skilled in the art, these are only a few effective examples according to embodiments of systems, combinations, devices and methods of the present invention, other examples and techniques according to an embodiment of the present invention will be apparent to those skilled in the art. For example, the respective transistors 154, 155, 164, 164', 192, where each shown as bipolar junction-type transistors. Various types of field effect transistors or other types of switching/amplification units as understood by those of ordinary skill in the art can be employed in their place. For each of the above examples, in preferred configurations, the signal disruptor circuits are not tuned with the RFID interrogator circuit, and thus, rely on mutual inductive coupling with one or more adjacent RFID devices 32 thereby affect signal disruption.

Figure 25:
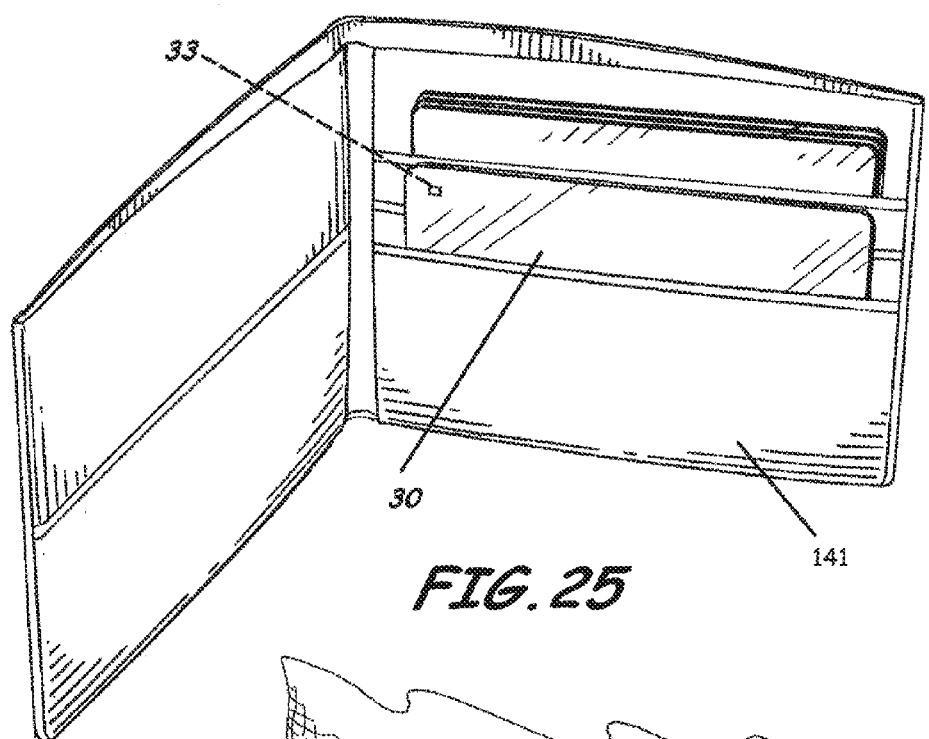
FIG. 25 is a perspective view of an RFID device positioned in a container.
Figure 26:
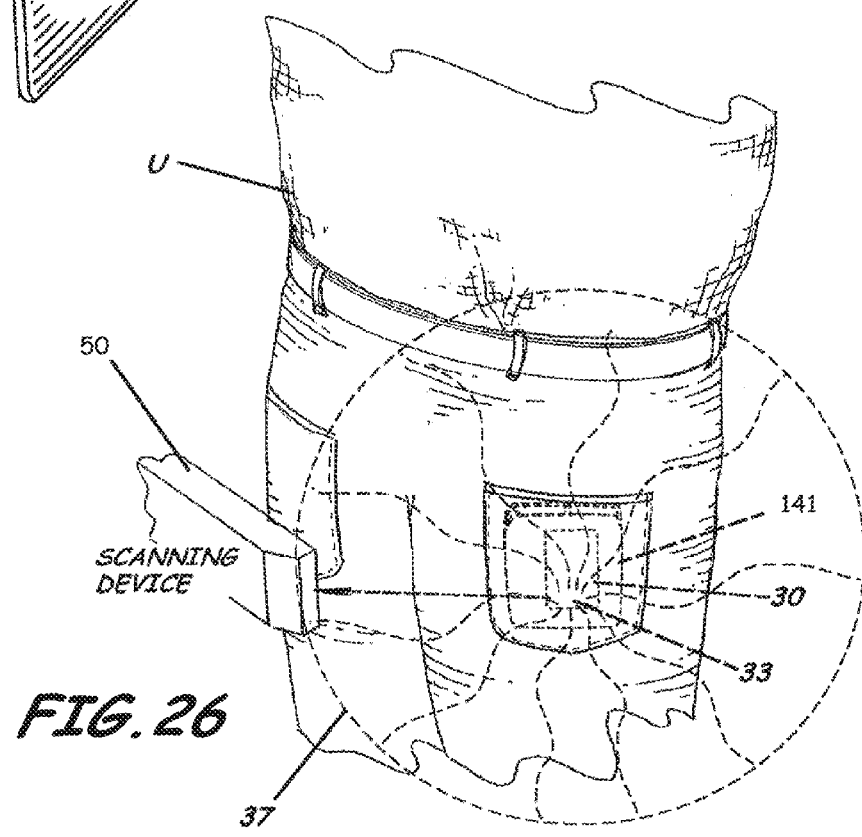
FIG. 26 is a perspective view of an RFID device positioned in a container, positioned in a pocket of a user, and being interrogated by an unauthorized interrogator with an RFID interrogation device.
Figure 27:
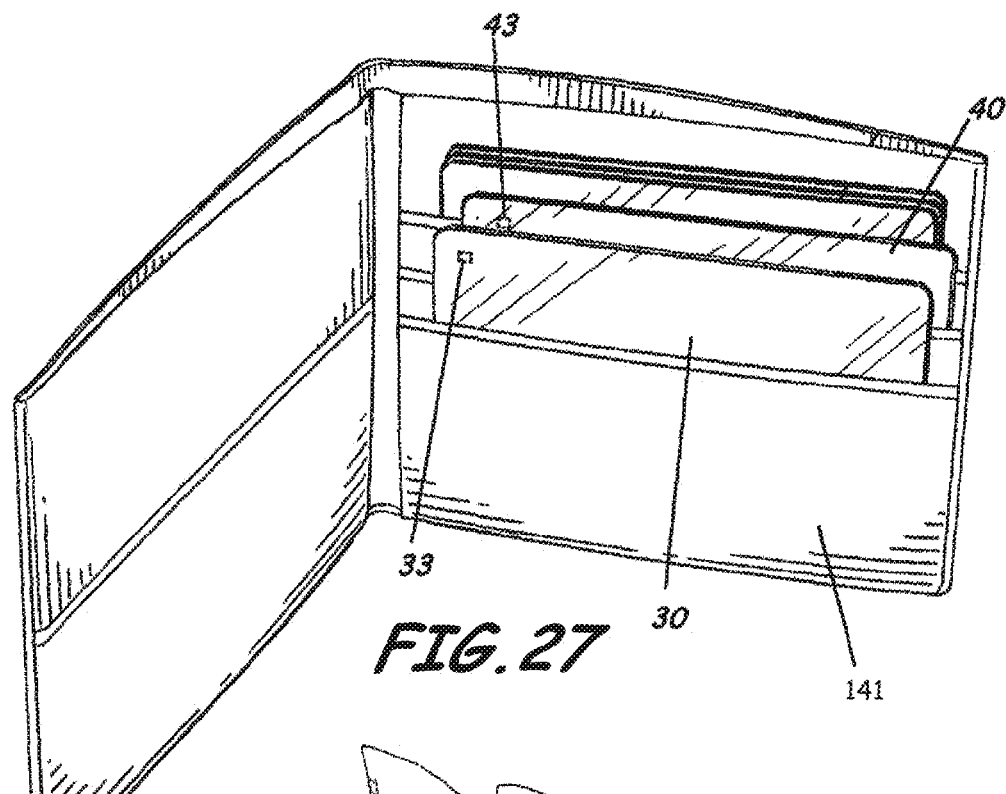
FIG. 27 is a perspective view of a combination of a separate RFID device and a separate RFID signal capture device positioned in a container according to an embodiment of the present invention.

FIGS. 25-26 illustrate an RFID device 30 in the form of a credit/debit card carrying the RFID tag 33 and positioned in a separate container (illustrated in the form of a wallet). As can be seen from the illustrations, when an unauthorized RFID interrogation occurs, i.e., when a scanning device ("interrogation device") or other form reader 50 is positioned within the interrogation response field or e-field 37 of the RFID tag and attempts to read the separate RFID device 30 from within the container 141, the data (e.g., credit/debit card account number, account ID, PIN, or any other data stored on the tag 33) can be readily extracted.

Figure 2:
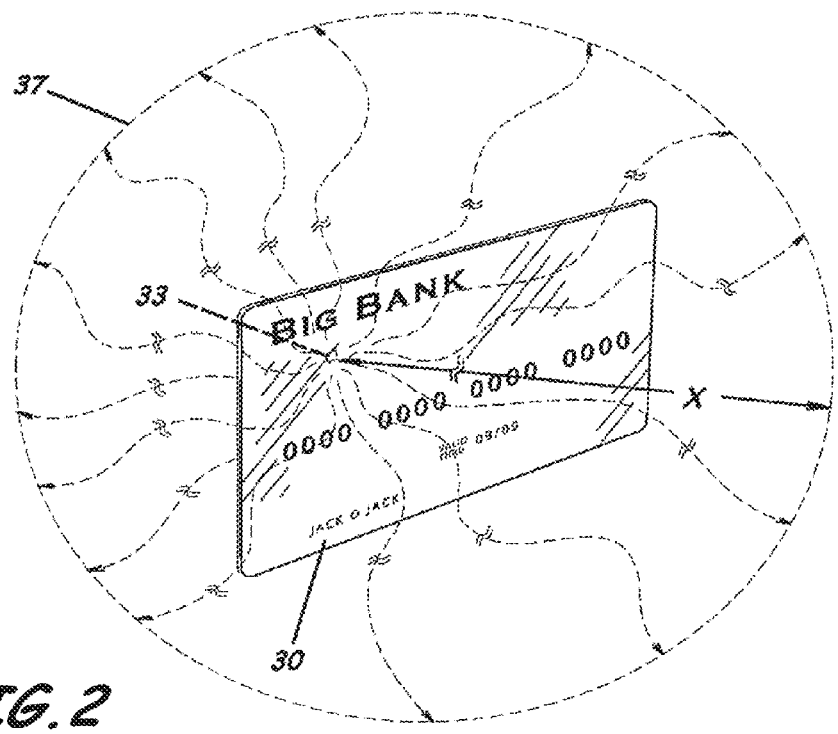
FIG. 2 is a schematic environmental view of a separate RFID device being interrogated by an RFID interrogation device.
Figure 3:
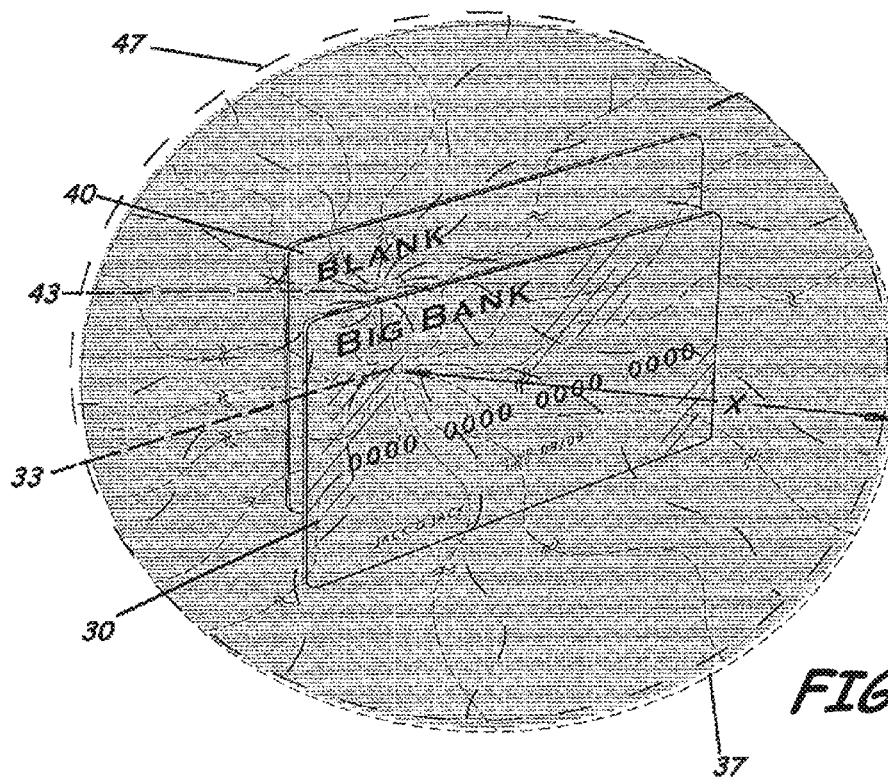
FIG. 3 is a schematic environment view of a combination of a separate RFID device and a separate RFID signal capture device configured to be positioned in a container according to an embodiment of the present invention.
Figure 4:
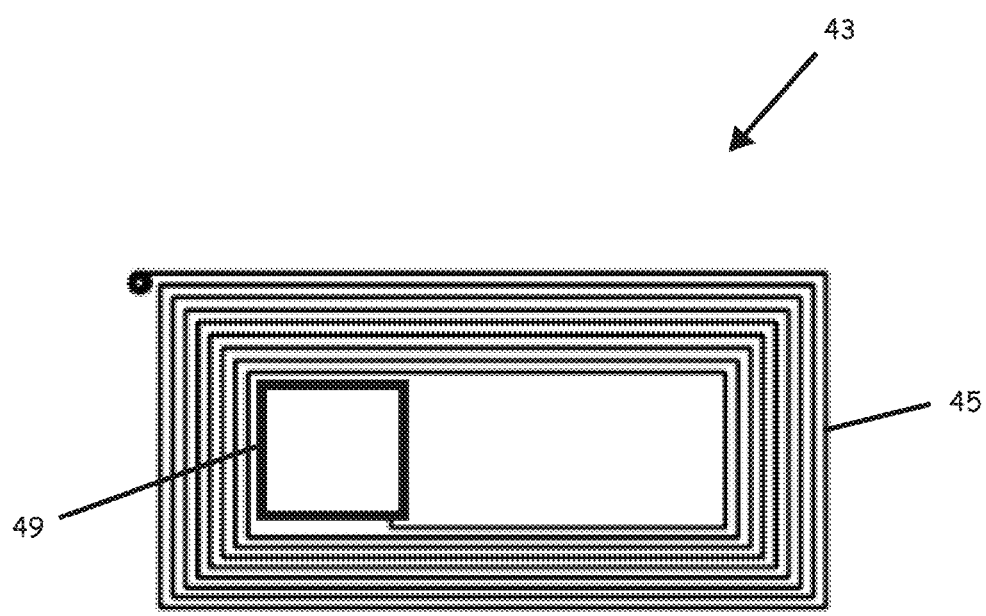
FIG. 4 is a schematic diagram of an RFID signal capture device according to an embodiment of the present invention.

In contrast, FIGS. 27-30, along with FIGS. 1-3, illustrate an example of an embodiment of a combination of the separate RFID device 30 containing a RFID tag 33 and a separate RFID signal capture device 40 containing a signal capture circuit 43, each configured to be positioned separately into, or to be associated with, both the body 41 of the RFID signal capture device 40 functioning as a container 41 carrying the circuit 43, and/or a separate container 141. Accordingly, the combination includes a separate RFID device and/or devices 30 configured to be positioned in the container 141 with a separate RFID signal capture device 40, illustrated in the form of a plastic card similar to a credit card, configured to be positioned adjacent the separate RFID device and/or devices 30 and in the container 141. That is, in the example shown in FIG. 27, the single RFID signal capture device 40 placed in a wallet pocket provides protection to multiple RFID devices 30, simultaneously. Note, in an alternative embodiment of the present invention, the signal capture circuit 43 can be directly embedded within or otherwise carried by the container 141 adjacent to the card carrying portion (e.g., wallet/purse credit card slot, etc.) to allow automatic protection merely by placing the RFID device and/or devices 30 (e.g., credit card(s)) in the appropriate credit card slot, etc., of the container 141.

In operation, when an unauthorized RFID interrogation occurs, i.e., when a scanning device ("interrogation device") or other form reader 50 attempts to read the separate protected RFID device/devices 30 from within the container 141 (see, e.g., FIG. 28), the separate RFID signal capture device 40 positioned adjacent the separate RFID device/devices 30 prevents the attempted interrogation or read. When an authorized user U desires to use one of the separate RFID device 30 for an authorized read, such as an authorized interrogation device 50, the authorized user U can selectively remove either the desired separate RFID device 30 or the separate RFID signal capture device 40 and present the separate RFID device 30 (within or outside of the container as long as sufficiently separated) for the authorized read by an authorized reader 50' (see, e.g., FIG. 29). Note, when the RFID signal capture device 40 is protecting multiple RFID devices 30, a preferred, if not required, procedure would be to remove the desired RFID device 30 to allow an authorized read by an authorized reader (e.g., reader 50' in FIG. 29), while maintaining protection of the remaining RFID devices 30 located, for example, in the container 141.

Note, the container 141 to carry the RFID signal capture device 40, for example, can be in the form of a wallet, a passport, a purse, a folder, a pocket, an envelope, a card holder, a sleeve, and/or a display mount, just to name a few. According to embodiments where the signal capture circuit 43 is directly carried by the container 141, rather than indirectly via a separate container such as, for example, the illustrated body 41 of a plastic card (see, e.g., FIG. 1), the portion of the container 141 carrying the circuit 43 functionally becomes the RFID signal capture device 40 referred to herein. According to such embodiments, the container 141 can also include other items therein, such as other credit or debit cards, money, jewelry, paper or sheets as understood by those skilled in the art. Note also, the container 141 is illustrated in FIGS. 25-30 as a separate holder for credit or debit cards, disembodied from the "plastic card" embodiment shown in FIG. 1 and in FIGS. 25-30. As understood by those skilled in the art, however, numerous other types of containers or configurations are within the scope of the present invention to include a passport and clip or tag for a page in a passport (see, e.g., FIG. 32), and a readily removable clip or tag for a credit or debit card (not shown), just to name a few.

As noted above, an RFID device 30, for example, can be a credit card, a debit card, other transaction card (e.g. telephone, gift, electronic, smart) a passport, a passport cover or page, a drivers license, or other device containing an RFID tag 33 as understood by those skilled in the art. FIGS. 1-3 and 25-30 illustrate credit or debit cards as RFID devices 30, and FIGS. 31-32 illustrate passports as RFID devices 30'. These are only for illustrative purposes and many other types of devices having RFID tags 33 associated therewith can be used as well according to an embodiment of the present invention. Similarly, as noted above, an embodiment of a separate RFID signal capture device 40, for example, likewise can be a credit or debit card or other transaction card, tag, clip, sheet, or other device that also has circuitry or a chip 43.

Figure 28:
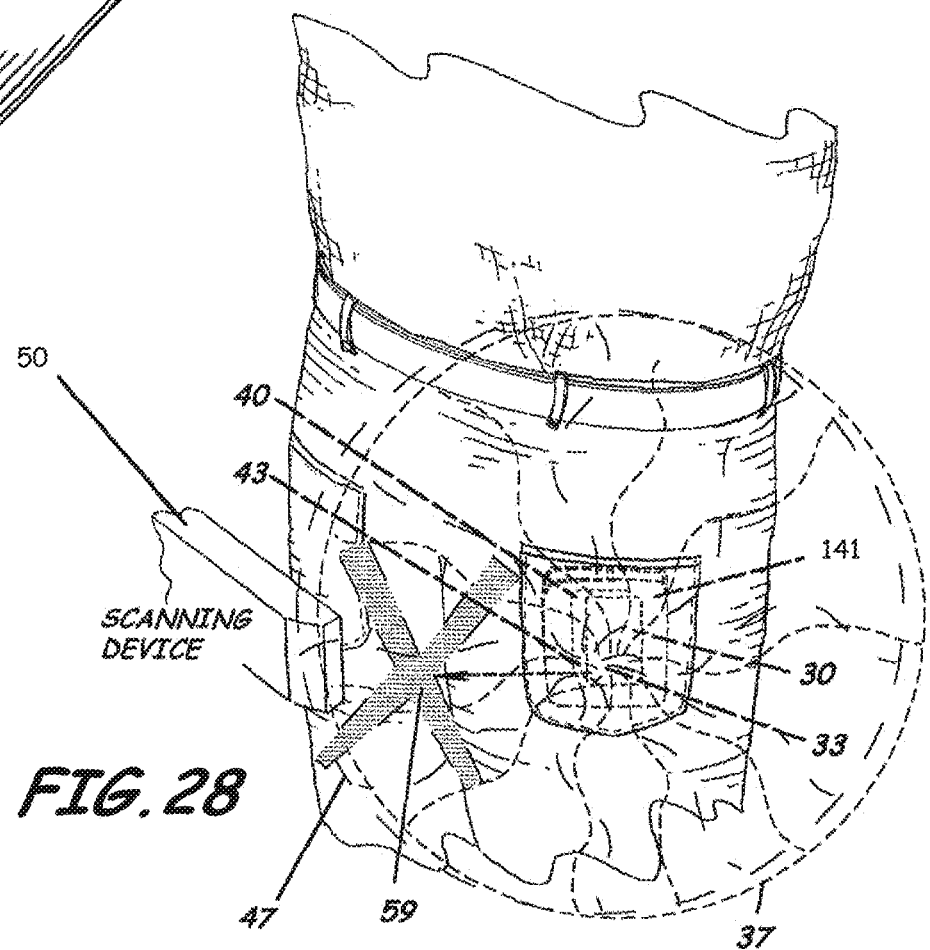
FIG. 28 is an environmental view of the combination of a separate RFID device and a separate RFID signal capture device positioned in a container as illustrated in FIG. 25, positioned in a pocket of an authorized user, and being interrogated by an unauthorized interrogator with an RFID interrogation device according to an embodiment of the present invention.
Figure 29:
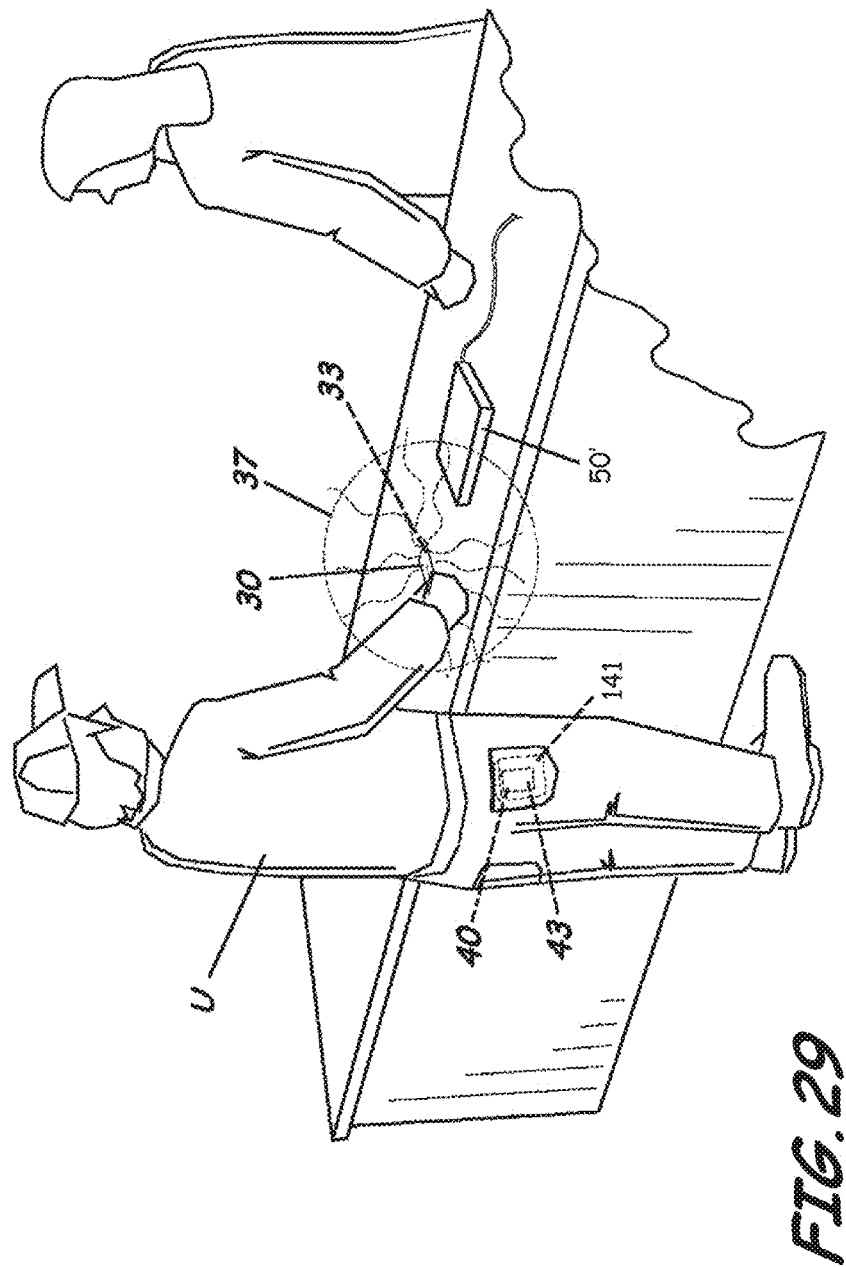
FIG. 29 is an environmental view of an authorized user using a separate RFID device for an authorized RFID read after selective removal of the same from a container having a combination of a separate RFID and a separate RFID signal capture device positioned therein according to an embodiment of the present invention.
Figure 30:
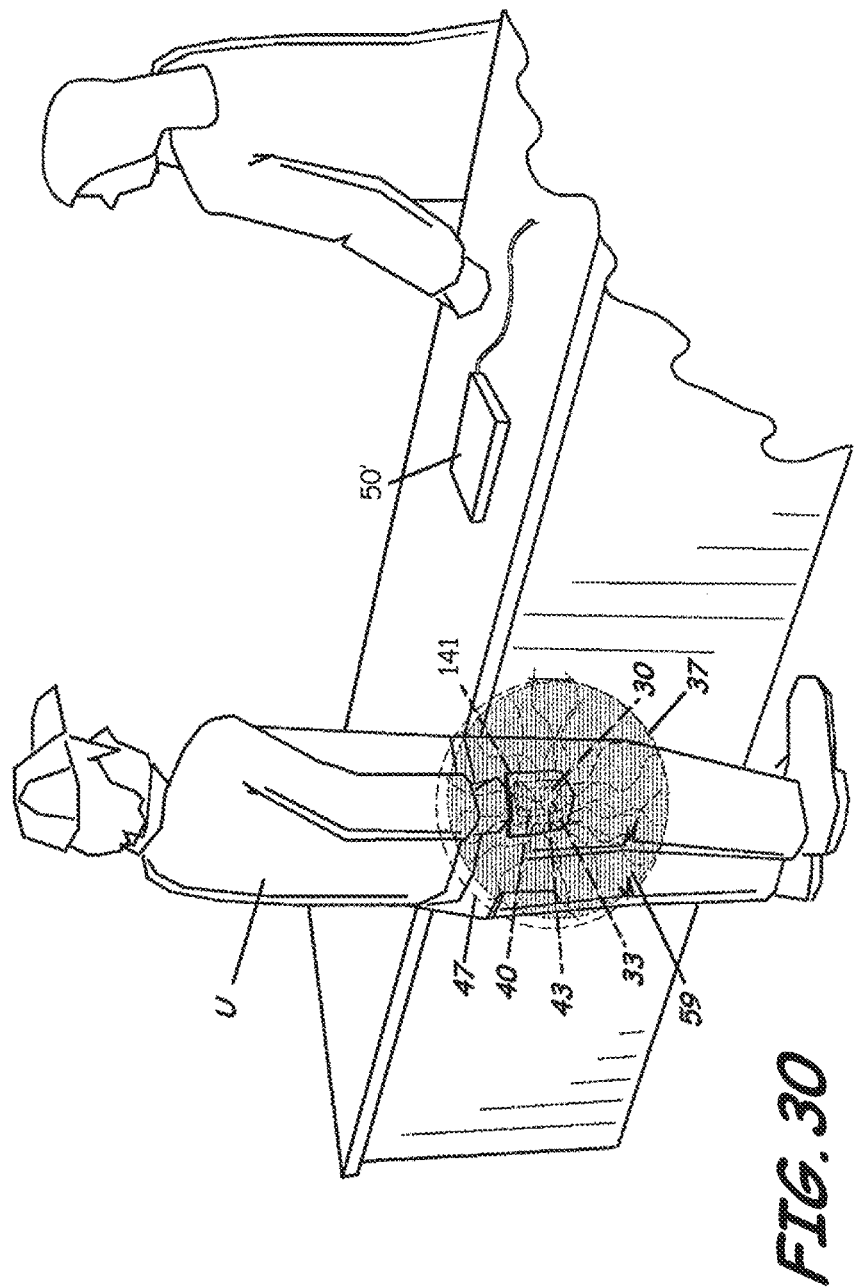
FIG. 30 is an environmental view of a separate RFID device being returned to a container so that the container has a combination of a separate RFID device and a separate RFID signal capture device according to an embodiment of the present invention.
Figure 33:
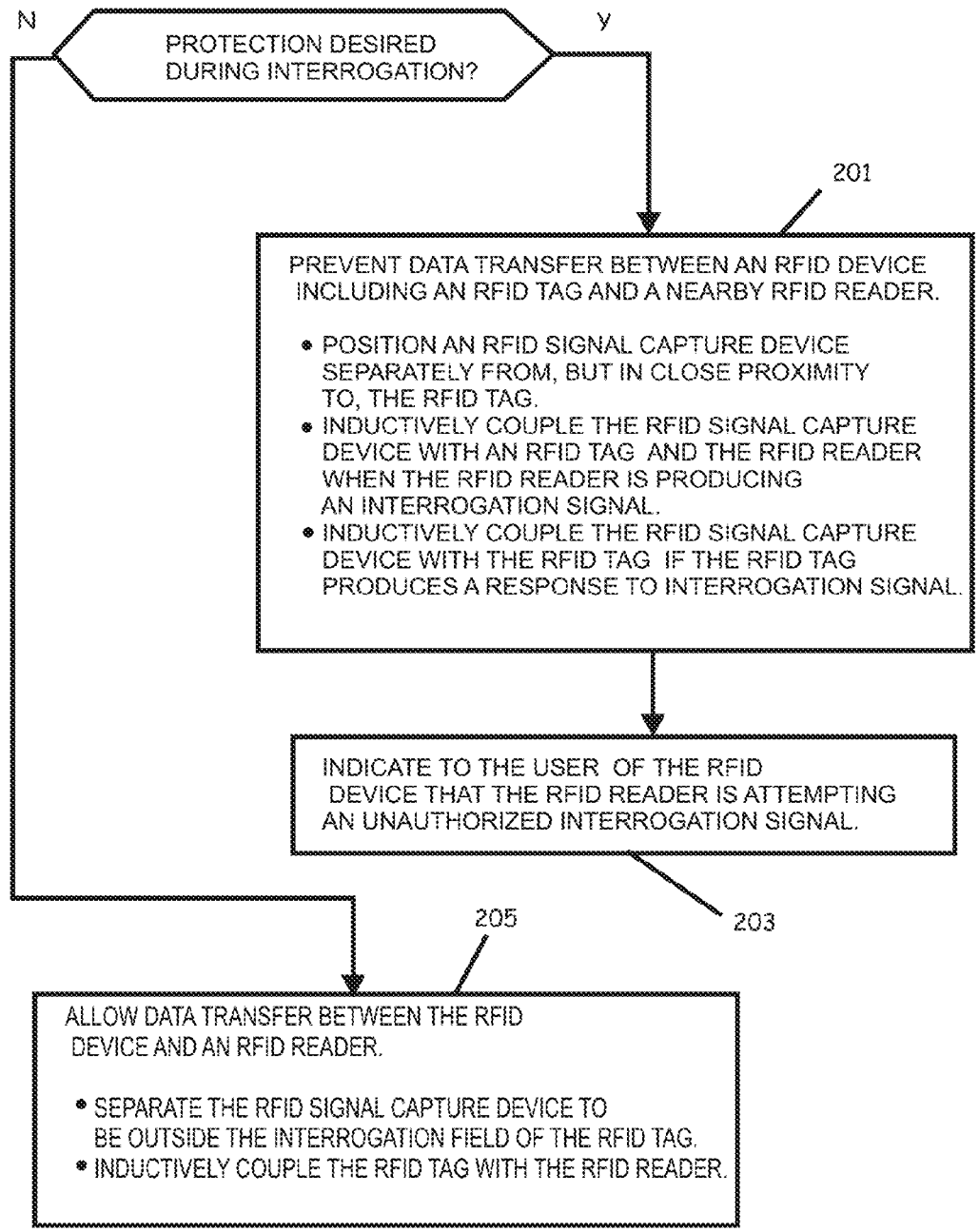
FIG. 33 is a schematic block flow diagram of a method of preventing data transfer between an RFID reader and an RFID tag according to an embodiment of the present invention.

As perhaps best shown in FIGS. 2-3 and 28, an RFID interrogation device or other form of reader 50 can be positioned separate and spaced-apart from an RFID device 30 a selected distance X and an interrogation response field or e-field 37 from the RFID tag 33 of the RFID device 30 can be generated by the RFID device 30 in response to the interrogation. Concurrently, for example, a second e-field 47 can also be generated by the RFID signal capture device 40 in response to the same interrogation to thereby generate a blocking zone 59 such as by disrupting the interrogation signals, interfering with the transmitting signal from the RFID device 30, or other techniques understood by those skilled in the art, including those detailed previously.

Likewise, as shown in FIGS. 31-32, an RFID device 30' such as in the form of a passport or passport cover can have RFID or other contactless circuitry or chip 33 associated therewith and can generate the RF e-field 37 responsive to the interrogation. An RFID or other contactless circuitry signal capture device 40', such as in the form of a tag, clip, or page marker also having the RFID or other contactless blocking circuitry (e.g., signal capture circuit 43, 43', 43"), can be attached to the passport 30', such as one of the pages thereof, to generate an RF blocking field 75 or blocking zone 59, such as described previously.

As illustrated in FIGS. 1-34, embodiments of the present invention also include methods of preventing data transfer between a nearby RFID interrogation device or other reader 50 and an RFID transponder or tag 33 to thereby enhance protection against unauthorized access to RFID or other contactless chip devices, and/or to prevent unauthorized tracking of the user based on the data stored in the tag 33. For example, an embodiment of such a method can include positioning a separate RFID signal capture device 40 adjacent one or more separate RFID devices 30 to block or otherwise prevent RFID interrogation and selectively separating a selected RFID device 30 from the separate RFID signal capture device 40 for authorized interrogation of the selected RFID device 30. The positioning, for example, can include either the separate RFID signal capture device 40 or the separate one or more RFID devices 30 being in a container 141 prior to positioning the separate RFID signal capture device 40, adjacent the separate one or more RFID devices 30. The prevented or otherwise disrupted RFID interrogation can include an unauthorized RFID interrogation. The container 141, for example, can include a wallet, a passport, a purse, a folder, a pocket, an envelope, a sleeve, a card holder, and a display mount. The blocking/prevention of the RFID interrogation, for example, can interfere with the activation of an anti-collision protocol associated with each separate RFID device 30 or interfere with the transmission of an anti-collision protocol associated with each separate RFID device 30, for example. Alternatively, the blocking/prevention of the RFID interrogation can include providing disrupting read signals responsive to an attempted interrogation of the separate one or more RFID devices 30. Note, one of ordinary skill in the art would understand that the components and methods described with respect to each respective RFID device 30 are equally applicable to RFID device 30' shown, for example, in FIG. 31.

Another embodiment of a method of enhanced protection against unauthorized interrogation of a contactless circuiting device includes positioning a separate contactless signal capture device (e.g., RFID signal capture device 40, 40') in association with a container and adjacent each separate contactless circuitry device to be protected (e.g., RFID device 30, 30') to thereby block or otherwise prevent unauthorized interrogation of the separate contactless circuitry device/devices, and selectively separating a separate contactless circuitry device from being adjacent the separate contactless signal capture device for authorized interrogation of the separate contactless circuitry device. Contactless circuitry of the separate contactless circuitry device to be protected, for example, can be in the form of various contactless devices to include RFID, Bluetooth, WI-FI, radio frequency microwave frequency, cellular frequency, global positioning system, and optical/infrared (with some modifications).

Another embodiment of a method of preventing data transfer between a nearby RFID reader 50 and an RFID transponder "tag" 33 containing data to be protected generally carried by an RFID device 30, 30', can include the steps of inductively coupling an RFID signal capture device 40, 40', with the RFID tag 33 and the RFID reader 50 to thereby effectively prevent data transfer between the RFID tag 33 and the nearby RFID reader 50 when the RFID signal capture device 40, 40', is positioned by a user in close proximity to the RFID tag 33 and when the RFID reader 50 is producing an interrogation signal (block 201). The step of preventing data transfer can also include inductively coupling the RFID signal capture device 40, 40', with the RFID tag 33 when positioned in close proximity to the RFID tag 33 and when the RFID tag 33 is producing a reply to an interrogation signal. This step can also include preventing data transfer between the RFID reader 50 and multiple protected RFID tags 33, simultaneously, to include inductively coupling the RFID signal capture device 40, 40', with at least one, but preferably each of the protected RFID tags 33 when positioned in close proximity to the RFID tags 33, such as, for example, when placed together in a credit card section of a wallet/purse, etc., and when the respective RFID tags 33 are being interrogated with an interrogation signal and/or producing a reply to the interrogation signal.

A method can also include indicating to the user of the RFID tag 33 that the RFID reader 50 is attempting to interrogate the RFID tag 33 (or tags 33 if multiple are being protected) when the RFID reader 50 is producing the interrogation signal and when the RFID signal capture device 40, 40', is in close proximity to the RFID tag 33 (block 203). Accordingly, the step of indicating to the user of the RFID tag 33 that the RFID reader 50 is attempting to interrogate the RFID tag 33 can include illuminating a visual indicator 68 carried by the RFID signal capture device 40, 40', and/or sounding an audible indicator 68 carried by the RFID signal capture device 40, 40'. Note, the RFID signal capture device 40, 40', can be configured so that such indication is not provided when the RFID signal capture device 40, 40', is not in close proximity to the RFID tag 33.

The method can also include allowing data to transfer between the RFID device 30, 30', and an RFID reader 50 by selectively substantially separating the RFID signal capture device 40, 40', from being adjacent the RFID tag 33 to allow authorized interrogation of the RFID tag 33 (block 205). Accordingly, the RFID signal capture device 40, 40', can be configured to not interfere with operation of the RFID reader 50 when the RFID signal capture device 40, 40', is not positioned in close proximity to an RFID tag 33. Further, according to a preferred configuration, the RFID signal capture device 40, 40' is generally adapted to provide a visual or audible indication of an interrogation signal when positioned sufficiently close to the RFID reader 50, regardless of its position with respect to the RFID device 30, 30'. Still further, the RFID signal capture device 40, 40', can alternatively be configured to provide a visual or audible indication of data transfer when the RFID signal capture device 40, 40', is not positioned in close proximity to the RFID tag 33 so as not to disrupt communication between the RFID device 30, 30', and the RFID reader 50 as long as the RFID signal capture device 40, 40', is positioned sufficiently close to the RFID reader 50.

Figure 34:
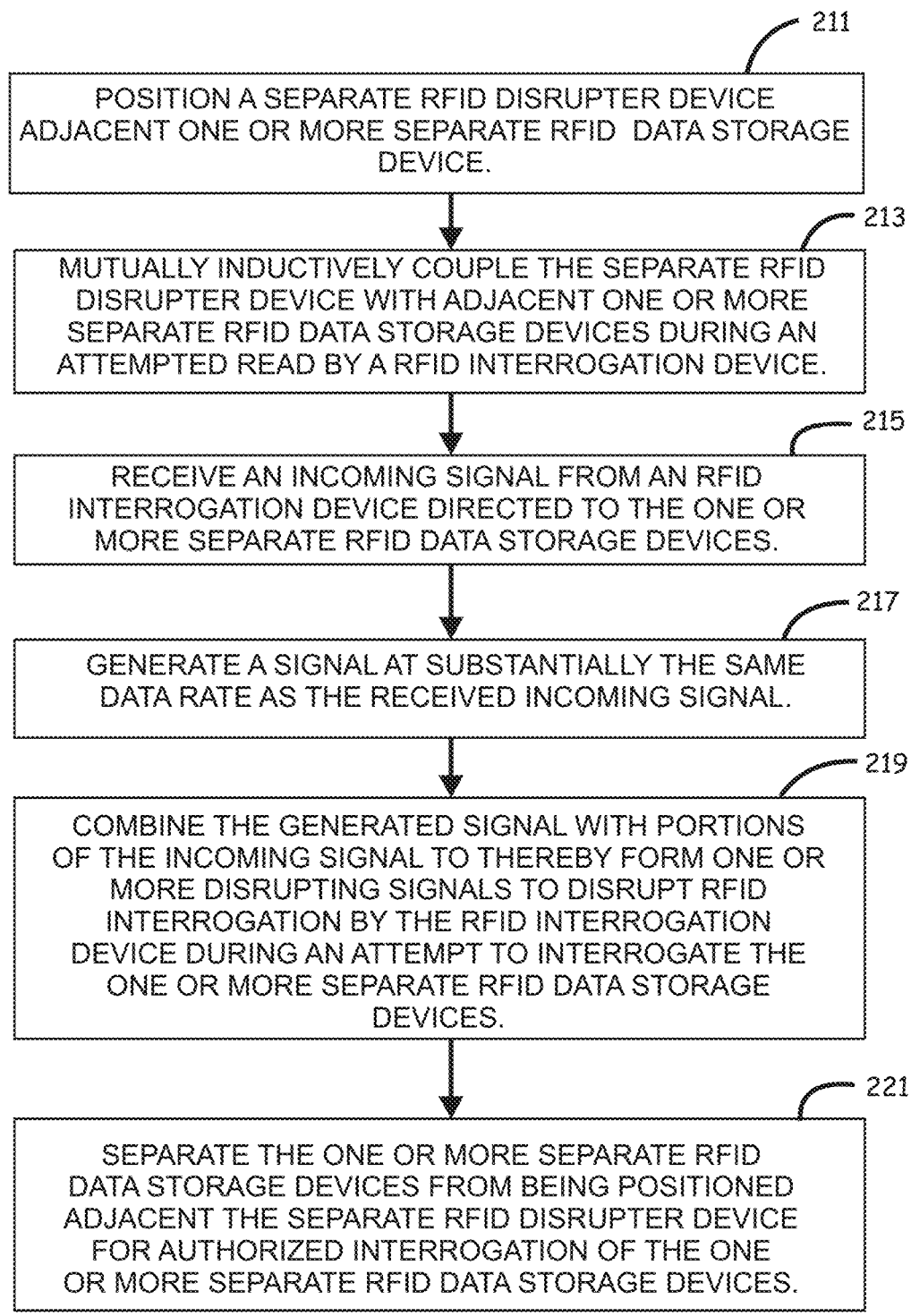
FIG. 34 is a schematic flow diagram of a method of preventing data transfer between an RFID reader and an RFID tag according to an embodiment of the present invention.

As shown in FIG. 34 and in FIGS. 11A-11H, a method of enhancing protection against unauthorized interrogation of a one or more RFID data storage devices (30, 30') can include positioning a separate RFID disrupter device or RFID signal capture device (40, 40') adjacent one or more separate RFID data storage devices (30, 30') (block 211). The RFID disruptor device includes an RFID signal disruptor circuit positioned or contained within a container. The RFID signal disruptor circuit can include a transducer positioned to receive portions of the RFID interrogation signal and to emanate a disruptive signal, a high-speed switch operably coupled to the transducer to provide for approximate signal synchronization with the RFID interrogation signal to thereby generate the disruptive signal having an insubstantial propagation delay, and a signal ringer comprising a current regulator coupled to the high-speed switch to extend a duration of the disruptive signal being generated.

The method can also include mutually inductively coupling the separate RFID disrupter device with the adjacent one or more separate RFID data storage devices (30, 30') during an attempted read by a RFID interrogation device (50, 50') (block 213), receiving, by the separate RFID disrupter device, portions of an incoming signal from an RFID interrogation device (50, 50') directed to the one or more separate RFID data storage devices (30, 30') (block 215), generating, by the separate RFID disrupter device, a signal at substantially the same data rate as the received incoming signal (block 217), and combining the generated signal with portions of the incoming signal to thereby form one or more disrupting signals to disrupt RFID interrogation by the RFID interrogation device (50, 50') during an attempt to interrogate the one or more separate RFID data storage devices (30, 30') (block 219). The one or more disrupting signals form a disrupting zone extending adjacent the one or more separate RFID data storage devices (30, 30') to disrupt the ability of the one or more separate RFID data storage devices (30, 30') to properly communicate in response to an attempted read from an RFID interrogation device (50, 50') when the RFID interrogation device (50, 50') is positioned to read the one or more separate RFID data storage devices (30, 30') and the separate RFID disrupter device is positioned adjacent the one or more separate RFID data storage devices (30, 30').

The method can also include selectively separating the one or more separate RFID data storage devices (30, 30') from being positioned adjacent the separate RFID disrupter device to allow authorized interrogation of the one or more separate RFID data storage devices (30, 30') (block 221).

This application is a continuation of U.S. application Ser. No. 15/348,791, titled "RFID DISRUPTION DEVICE AND RELATED METHODS," filed Nov. 10, 2016, which is a continuation of U.S. application Ser. No. 14/785,583, titled "RFID DISRUPTION DEVICE AND RELATED METHODS," filed Oct. 19, 2015, now U.S. Pat. No. 9,525,510, issued Dec. 20, 2016, which is a 35 U.S.C. 371 National Stage of International Application No. PCT/US2013/040636, titled "RFID DISRUPTION DEVICE AND RELATED METHODS," filed May 10, 2013, which claims priority to U.S. Provisional Application No. 61/817,686, titled "RFID DISRUPTION DEVICE AND RELATED METHODS," filed Apr. 30, 2013, and U.S. Provisional Application No. 61/814,124, titled "RFID DISRUPTION DEVICE AND RELATED METHODS," filed Apr. 19, 2013, all of which are incorporated by reference herein in their entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the above and exemplary embodiments generally referred to RFID transponders/tags functioning at 13.56 MHz, it should be understood that applications according to other frequencies such as, for example, 900 MHz, and others, are within the scope of the present invention. Also, for example, although primarily described with respect to a single RFID tag 33 on a single RFID device, applications of the RFID signal capture devices or disrupter devices include those positionable to not only protect a single RFID device 30, 30' carrying a single RFID tag 33, or multiple RFID devices 30, 30' each carrying a separate single independent RFID tag 33, but also single or multiple RFID devices 30, 30', each carrying multiple RFID tags 33, having an anti-collision protocol and/or tuned for different frequencies.

The invention claimed is:

1. A radio frequency identification (RFID) signal disruptor device to prevent data transfer between a nearby RFID interrogation device and one or more RFID data storage devices when the RFID signal disruptor device is positioned adjacent the one or more RFID data storage devices interrogated therewith, the RFID signal disruptor device comprising a container, and an RFID signal disruptor circuit positioned to be associated with the container and configured to disrupt an attempted read of a separate RFID data storage device by the RFID interrogation device when the separate RFID data storage device is positioned adjacent the RFID signal disruptor circuit, the RFID signal disruptor device operatively receiving power needed to operate the RFID signal disruptor circuit from an interrogation signal emanating from the RFID interrogation device during the attempted read of the separate RFID data storage device when inductively coupled with the separate RFID data storage device, the RFID signal disruptor circuit being positioned to generate an oscillating disruptive signal during the attempted read by the interrogation signal, thereby to disrupt the one or more RFID data storage devices from communicating with the RFID interrogation device.

2. The RFID signal disruptor device as defined in claim 1, wherein the RFID signal disruptor device further includes one or more of the following:
   a transducer positioned to receive portions of the RFID interrogation signal and to emanate a disruptive signal,
   a high-speed switch operably to provide for approximate signal synchronization with the RFID interrogation signal to thereby generate the disruptive signal, and
   a current regulator to permit voltage fluctuations across the high speed switch.

3. An RFID signal disruptor device as defined in claim 1, wherein the RFID signal disruptor device further includes:
   a current regulator coupled to a high-speed switch.

4. The RFID signal disruptor device as defined in claim 2, wherein the RFID signal disruptor device is devoid of a permanent power storage device, relying on energy from the RFID interrogation signal to power the RFID signal disruptor circuit.

5. An RFID signal disruptor device as defined in claim 2, wherein the RFID signal disruptor device further includes
   a voltage regulator to stabilize a voltage of the high-speed switch; and
   wherein the inductor comprises a wound inductor.

6. An RFID signal disruptor device as defined in claim 2, wherein the RFID signal disruptor circuit further includes:
   a frequency regulator to control frequency characteristics of the disruptive signal.

7. An RFID signal disruptor device as defined in claim 1, wherein the RFID signal disruptor circuit further includes:
   a visual operation indicator to provide a visual indication that the RFID interrogation device is attempting to interrogate the separate RFID data storage device when the RFID signal disruptor circuit is positioned in close proximity to the separate RFID data storage device.

8. An RFID signal disruptor device as defined in claim 6, wherein the RFID signal disruptor circuit further includes:
   a voltage regulator to stabilize a voltage of the high-speed switch.

9. An RFID signal disruptor device as defined in claim 6, wherein the RFID signal disruptor circuit comprises:
   a frequency regulator to control frequency characteristics of the disruptive signal, the frequency regulator comprising a diode positioned to provide harmonic multiplication of the frequency of the interrogation signal; and
   wherein the diode is connected between the base and the emitter of a transistor.

10. A method of enhancing protection against unauthorized interrogation of one or more RFID data storage devices, the method comprising:
    positioning a separate RFID signal disrupter device adjacent one or more separate RFID data storage devices, the RFID disruptor device including an RFID signal disruptor circuit being positioned to generate an oscillating disruptive signal during an attempted read by an interrogation signal, thereby to disrupt the one or more RFID data storage devices from communicating with the RFID interrogation device;
    inductively coupling the separate RFID signal disrupter device with the one or more separate RFID data storage devices during an attempted read by an RFID interrogation device;
    receiving portions or more of an incoming signal from an RFID interrogation device directed to the one or more separate RFID data storage devices; and
    generating a signal to disrupt the attempted read by the RFID interrogation device.

11. The method of claim 10, further comprising:
    combining the generated signal with portions of the incoming signal to thereby form one or more disrupting signals to disrupt RFID interrogation by the RFID interrogation device during an attempt to interrogate the one or more separate RFID data storage devices, the one or more disrupting signals forming a disrupting zone extending adjacent the one or more separate RFID data storage devices to disrupt the ability of the one or more separate RFID data storage devices to properly communicate in response to an attempted read from an RFID interrogation device.

12. The method of claim 11, further comprising:
    selectively separating the one or more separate RFID data storage devices from being positioned adjacent the separate RFID signal disrupter device to allow authorized interrogation of the one or more separate RFID data storage devices.

13. The method of claim 11, further comprising:
    controlling frequency characteristics of the signal via a frequency regulator, the frequency regulator providing harmonic multiplication of the frequency of the incoming signal.

* * * * *